(12) United States Patent
Shoji et al.

(10) Patent No.: US 8,035,754 B2
(45) Date of Patent: Oct. 11, 2011

(54) RECEIVER APPARATUS AND INFORMATION RECORDING/OUTPUTTING APPARATUS

(75) Inventors: Hiroyuki Shoji, Katsuragi (JP); Yoshikazu Suga, Sakai (JP); Kouichi Aoto, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 1477 days.

(21) Appl. No.: 11/492,002

(22) Filed: Jul. 25, 2006

(65) Prior Publication Data

US 2007/0025691 A1    Feb. 1, 2007

(30) Foreign Application Priority Data

Jul. 28, 2005 (JP) ................ P2005-219312
Jul. 28, 2005 (JP) ................ P2005-219313

(51) Int. Cl.
*H04N 5/44* (2006.01)
*H04N 5/455* (2006.01)

(52) U.S. Cl. ........ 348/725; 348/726; 348/731; 348/729; 455/189.1; 375/324

(58) Field of Classification Search ............ 348/726, 348/725, 731, 732, 729, 723, 724; 375/316, 375/324; 455/189.1, 232.1, 234.1; 386/46
See application file for complete search history.

(56) References Cited

U.S. PATENT DOCUMENTS 5,437,051 A * 7/1995 Oto .............................. 455/3.02
5,825,756 A    10/1998 Hattori
6,118,499 A * 9/2000 Fang ............................. 348/726
6,151,488 A    11/2000 Brekelmans
6,442,328 B1 * 8/2002 Elliott et al. .................. 386/46
6,765,626 B1    7/2004 Tanaka
6,766,157 B1 * 7/2004 Hunzeker et al. ............. 455/317

FOREIGN PATENT DOCUMENTS

| JP | 6-69829 | 3/1994 |
|---|---|---|
| JP | 9-9193 | 1/1997 |
| JP | 9-74364 A | 3/1997 |
| JP | 10-294930 | 11/1998 |
| JP | 2000-513896 | 10/2000 |
| JP | 2001-136446 A | 5/2001 |
| JP | 2002-185219 A | 6/2002 |
| JP | 2003-258660 A | 9/2003 |
| JP | 2003-289490 | 10/2003 |
| JP | 2003-347982 A | 12/2003 |
| JP | 3100213 | 5/2004 |

* cited by examiner

*Primary Examiner* — Michael Lee
*Assistant Examiner* — Jean W Desir
(74) *Attorney, Agent, or Firm* — Nixon & Vanderhye P.C.

(57) ABSTRACT

First and second signal processing units are each configured by an IC, so that the circuit space occupying in a receiver apparatus can be reduced. The signal path can be shortened from a BPF section inputting a program signal coming from a broadcasting station to a demodulation section compared with the related art. The transmission loss on the signal path can be thus reduced compared with the related art. The possible route for noise entering from the outside to the first and second signal processing units can be made as short as possible. This enables to reduce the noise entering from the outside, and prevents the signals coming over the signal path from being attenuated by the noise so that the signal reception sensitivity can be increased.

9 Claims, 9 Drawing Sheets

RECEIVER APPARATUS AND INFORMATION RECORDING/OUTPUTTING APPARATUS

BACKGROUND OF THE INVENTION

1. Field of the Invention

The invention relates to a receiver apparatus capable of receiving program information coming from a broadcasting station for a plurality of channels, for example, and outputting the received program information, and relates to an information recording/outputting apparatus equipped with the receiver apparatus.

2. Description of the Related Art

The multi-channel services have been recently available for broadcasting because of expanded range of services, e.g., terrestrial broadcasting using ground antennas, Broadcasting Satellite (BS) broadcasting using broadcasting satellites, Communication Satellite (CS) broadcasting using communication satellites, and community antenna television (CATV) broadcasting. As the multi-channel services become popular for broadcasting as such, recorder devices exemplified by a hard disk recorder is increased in capacity available for recording of program information. The number of channels is also increased, being capable of simultaneously recording plural pieces of program information coming at the same time from a broadcasting station.

As the broadcasting technologies are advanced and the recorder devices are improved, there has been a demand for a receiver apparatus equipped with a tuner, which is capable of receiving plural pieces of program information at the same time for a plurality of channels, and outputting the received program information all at once to display devices and recorder devices. Herein, the display devices are those exemplified by television receivers, projector devices, and others, and the recorder devices are those exemplified by hard disk recorders. The following related arts are related to a receiver apparatus aiming to meet such a demand, i.e., Japanese Unexamined Patent Publication JP-A 2000-513896, Japanese Unexamined Patent Publication JP-A 6-69829 (1994), Japanese Unexamined Patent Publication JP-A 10-294930 (1998), and Japanese Utility Model No. 3100213.

JP-A 2000-513896 describes a receiver apparatus of a multi-tuner type, equipped with two tuners in a module. In the receiver apparatus, the oscillation frequency of these two tuners is not tuned to the radio frequency or harmonics of a signal received by either of the two tuners so that interference is prevented therebetween.

JP-A 6-69829 describes an IC receiver apparatus, including a tuner circuit whose high-frequency circuit section is of a two-chip configuration. The two-chip configuration includes an RF amplification IC and an AGC mixer IC using a GaAs field-effect transistor having excellent high frequency characteristics and third-order distortion characteristics. This leads to the small-sized tuner circuit having excellent third-order distortion characteristics with the fewer number of components.

JP-A 10-294930 describes a digital tuner in which two channels are alternately switched under the control of a CPU (Central Processing Unit) so that video/audio signals provided by an antenna for these channels are received at the same time. As to the two channels, one is a user-select channel, and the other is a channel adjacent to the user-select channel in the forward direction, i.e., in the channel switching direction.

In a television tuner unit described in Japanese Utility Model No. 3100213, a plurality of television tuners are disposed in line on a motherboard. In the respective television tuners, an incoming television signal is amplified by a first wide-range amplifier, and thus amplified television signal is split by a splitter into two directions.

With such a television tuner unit described in Japanese Utility Model No. 3100213, however, after the television signal input to the corresponding tuner is split by the splitter, the signal is attenuated in level in proportion to the number of splitting so that a so-called splitting loss is increased. The television tuner is thus required to equip a correction circuit including individual components, e.g., a balun transformer, an amplifier transistor, and a filter, for the aim of correcting the splitting loss. The concern here is that the component values of such individual components vary in absolute value, whereby the tuner shave to be increased in reception sensitivity. This arises another necessity for the respective tuners to equip high-frequency components that are high in performance capability but expensive. As a result, problematically, the manufacturing cost is increased.

Another problem with the television tuner unit described in Japanese Utility Model No. 3100213 is that the circuit occupies the larger space in the receiver apparatus including the television tuners. This is due to the configuration that the tuners are each shielded by a metal-made cabinet together with each corresponding correction circuit, and such tuners are disposed in line. As the circuit is increased in size as such in the receiver apparatus, the power consumption of the receiver apparatus is resultantly increased.

An information recording/outputting apparatus equipped with a receiver apparatus compatible with such multi-channel services has also been developed. Japanese Unexamined Patent Publication JP-A 9-9193 (1997) describes a multi-channel recording/reproducing apparatus equipped with a plurality of tuners and a large-capacity hard disk drive. In the multi-channel recording/reproducing apparatus, the tuners each receive broadcast programs for a plurality of channels, and video signals based on the received broadcast programs are encoded for recording to the hard disk drive. The encoded signals recorded on the hard disk drive are converted into original video signals by a decoder, and then provided to a television receiver so that programs represented by the encoded signals are reproduced by the television receiver.

Japanese Unexamined Patent Publication JP-A 2003-289490 describes a broadcast program recorder apparatus which allows a user to set a "store by" date for program information to be recorded. Such a date setting is allowed to make when the user programs the apparatus to record a broadcast program, or when the user actually records the broadcast program. Based on thus set "store by" date, the program information is accordingly deleted.

With the JP-A 9-9193, when the video signals are encoded for recording to the hard disk drive after the tuners receive a plurality of television broadcast programs, the video signals are subjected to compression prior to recording. This is aimed to record the video signals as many as possible. The problem with the first related art is that the recording of the video signals or others is allowed only up to the recording capacity of the hard disk drive. For more recording of the video signals, the hard disk drive may be possibly increased in capacity to a further degree. When this is the case, however, the larger the capacity of the hard disk drive, the likelier that the manufacturing cost is increased.

With the JP-A 2003-289490, the "store by" date set by the user is used as a basis to delete the program information so that the recording capacity is reserved on the recording medium. This aims to enable the effective use of the recording medium. The problem with the second related art is that, however, the user is required to make a program setting to record a broadcast program. When no program setting is made, or when the user starts watching a broadcast program not from the beginning, the user cannot view the entire program he or she did not program to record or the part of the program he or she failed to watch as did not start watching the program from the beginning. In this sense, there is a problem that the user's convenience for use is considered poor.

SUMMARY OF THE INVENTION

An object of the invention is to provide a receiver apparatus and an information recording/outputting apparatus, capable of increasing signal reception sensitivity and reducing both manufacturing costs and power consumption.

Another object of the invention is to provide an information recording/outputting apparatus capable of swiftly and easily viewing program information recorded on a recording medium and effectively utilizing the recording medium.

The invention is directed to a receiver apparatus capable of receiving program signals relating to programs provided from a broadcasting station for a plurality of channels different in frequency band, comprising:

a first signal processing unit configured by an integrated circuit, for applying signal processing to the received program signals;

a second signal processing unit disposed on a downstream of the first signal processing unit, for applying signal processing to the signals provided from the first signal processing unit, the second signal processing unit being configured by an integrated circuit; and a control section for issuing to the first and second signal processing units a predetermined command to cause the first and second signal processing units to apply signal processing, wherein the first signal processing unit includes:

a first filter unit that passes therethrough any of the program signals of a first frequency band selectively from the program signals for the channels;

an amplification unit for amplifying the program signal provided from the first filter unit;

a splitting unit for splitting the program signal provided from the amplification unit for every channel;

a local oscillator for generating an oscillation signal of a predetermined oscillation frequency;

a mixer unit for mixing the program signals of the channels as a result of splitting by the splitting unit with the oscillation signal generated by the local oscillator to generate mixed signals;

a gain control unit for controlling a gain of the mixed signals generated by the mixer unit; and a second filter unit that passes therethrough any of the mixed signals of a second frequency band selectively from the mixed signals provided from the gain control unit, and wherein the second signal processing unit includes:

a conversion unit for converting the mixed signal provided from the second filter unit into a digital signal;

a third filter unit that passes therethrough any of the digital signals of a third frequency band selectively from the digital signals provided from the conversion unit; and a demodulation unit that demodulates the digital signal provided from the third filter unit.

According to the invention, the first signal processing unit configured by an integrated circuit applies signal processing to program signals coming from a broadcasting station. The program signals are about programs on a plurality of channels different in frequency bandwidth. In response to a predetermined command coming from the control section, the second signal processing unit applies signal processing to the signals provided from the first signal processing unit. The second signal processing unit is the one disposed on the downstream of the first signal processing unit, and is configured by an integrated circuit.

In the first signal processing unit, any of the program signals of a first frequency band is passed through the first filter unit selectively from the program signals for a plurality of channels, and is amplified by the amplification unit. The program signal provided from the amplification unit is split by the splitting unit for every channel. The local oscillator generates an oscillation signal of a predetermined oscillation frequency. The program signals as a result of splitting by the splitting unit for the respective channels are mixed with the oscillation signal generated by the local oscillator by the mixer unit so that mixed signals are generated. The mixed signals generated by the mixer unit as such are controlled in gain by the gain control unit. Any of the mixed signals of a second frequency band passes through the second filter unit selectively from the mixed signals provided from the gain control unit.

In the second signal processing unit, the mixed signal outputted from the second filter unit of the first signal processing unit is converted into a digital signal by the conversion unit. From the digital signals outputted from the conversion unit as such, any of the digital signals of a third frequency band passes through the third filter unit, and is demodulated by the demodulation unit.

The first and second signal processing units are each configured by an integrated circuit as described above. Therefore, compared with the configuration of the related art in which a plurality of tuners are disposed in line with each shielded by a metal cabinet together with its corresponding correction circuit, the receiver apparatus with the first and second signal processing units can be occupied less by the circuit. What is more, the received program signals are each split by the splitting unit in the first signal processing unit configured by an integrated circuit, thereby reducing the signal transmission loss in the first signal processing unit. Accordingly, the impedance can be uniform in level in the first signal processing unit. Unlike the related art, in the correction circuit provided for correcting the splitting loss, the component values of individual components do not vary in absolute value that much any more.

With the smaller-sized circuit in the receiver apparatus, the signal path can be shortened from the first filter unit receiving the program signals from the broadcasting station to the demodulation unit compared with the related art. This enables to reduce the transmission loss on the signal path compared with the related art, and the signals coming over the signal path can be prevented from signal-level-fluctuation so that signal transmission can be performed with relative stability.

With the shorter signal path as such, the possible route for noise entering from the outside to the first and second signal processing units can be accordingly made as short as possible. This thus enables to reduce the noise entering from the outside, and prevents the signals coming over the signal path from being attenuated by the noise so that the signal reception sensitivity can be increased. With the related art, the individual high-frequency components are so disposed as to increase the signal reception sensitivity. On the other hand, in the invention, no such individual high-frequency component is required to increase the signal reception sensitivity. Accordingly, compared with the related art, the number of components can be reduced in the receiver apparatus so that the manufacturing cost and the power consumption can be both reduced.

In an aspect of the invention, the demodulation unit is a digital signal processor.

According to the invention, the demodulation unit is a digital signal processor (hereinafter, occasionally referred to as "DSP"). The DSP can make a demodulation program switching from one to another based on a predetermined command issued by the control section, i.e., a command of switching a predetermined demodulation program to another demodulation program. The DSP is also capable of rewriting a demodulation program based on another predetermined command issued by the control section, i.e., a command of rewriting the demodulation program previously recorded on the DSP to another demodulation program. In the receiver apparatus, by changing the demodulation program previously recorded on the DSP based on the transmission scheme, the signal incoming to the DSP can be demodulated with relative ease in accordance with the demodulation program suiting the transmission scheme. What is more, the receiver apparatus is not required to separately include any specific demodulation unit depending on the transmission scheme so that the manufacturing cost can be reduced compared with the case of including any specific demodulation unit.

In another aspect of the invention, at least any one of a passing frequency bandwidth of the first filter unit, a conversion signal level of the conversion unit, and a passing signal level of the third filter unit is configured to be variable.

According to the invention, at least any one of the passing frequency bandwidth of the first filter unit, the conversion signal level of the conversion unit, and the passing signal level of the third filter unit is configured to be variable. More specifically, at least any one of the passing frequency bandwidth, the conversion signal level, and the passing signal level is configured to be variable to suit the transmission scheme determined by the control section. As such, because the passing frequency bandwidth, the conversion signal level, and the passing signal level can be varied to suit the transmission scheme, the signals going through the components in the first and second signal processing units can be prevented from fluctuation in signal level so that signal level can be stabilized.

With the signal level stabilized as such, there is no need to go through predetermined signal processing in such components as the first filter unit, the amplification unit, the second filter unit, the conversion unit, and the third filter unit for the aim of stabilizing the signal level so that the load of the signal processing can be reduced. This enables to reduce the power consumption as much as possible in such components as the first filter unit, the amplification unit, the second filter unit, the conversion unit, and the third filter unit.

In still another aspect of the invention, the conversion unit is a delta-sigma analog-digital converter.

According to the invention, the conversion unit is a delta-sigma analog-digital converter. With the use of a delta-signal analog-digital converter, mixed signals coming from the gain control unit in the first signal processing unit can be converted into digital signals with high precision. In other words, a delta-sigma analog-digital converter leads to highly precise digital signals without being affected by any noise entering from the outside.

As such, for signal processing aiming to eliminate the noise coming from the outside into such components as the first filter unit, the amplification unit, the second filter unit, and the third filter unit, there is no need to insure high precision so that the load of the signal processing can be reduced in such components as the first filter unit, the amplification unit, the second filter unit, and the third filter unit. This enables to reduce the power consumption as much as possible in such components as the first filter unit, the amplification unit, the second filter unit, and the third filter unit.

In still another aspect of the invention, the mixer unit carries out frequency conversion from the program signal to the mixed signal by direct conversion.

According to the invention, the mixer unit directly carries out frequency conversion from a high-frequency program signal to a low-frequency mixed signal by direct conversion. When direct conversion is not adopted, the oscillation signal generation unit generates an oscillation signal of a frequency suiting the conversion unit, and the mixer unit mixes the oscillation signal with the program signal, thereby converting the frequency of the received program signal into the frequency suiting the conversion unit. With such a frequency conversion scheme, any signal of unwanted frequency may be also converted and mixed with the program signal. There thus needs to include a filter unit for eliminating any signal of unwanted frequency.

On the other hand, in the aspect of the invention, a high-frequency program signal is directly converted into a low-frequency mixed signal. This thus enables to prevent any signal of unwanted frequency from being converted and being mixed with the program signal, as much as possible. As such, in the aspect of the invention, any signal of unwanted frequency is prevented from being converted and being mixed with the program signal, so that a filter unit is not required for eliminating such a signal of unwanted frequency. As such, compared with a case of including a filter unit for eliminating any signal of unwanted frequency, the number of components can be reduced in the receiver apparatus, and the power consumption can be reduced.

In still another aspect of the invention, the control section exercises control over the first filter unit in such a manner that the first filter unit has a smaller one of a passing frequency bandwidth of twice or smaller than a minimum reception frequency of the program signal, or a passing frequency bandwidth of half or smaller than a maximum reception frequency of the program signal.

According to the invention, the control section exercises control over the first filter unit in such a manner that the first filter unit has a smaller one of a passing frequency bandwidth of twice or smaller than a minimum reception frequency of the program signal, or a passing frequency bandwidth of half or smaller than a maximum reception frequency of the program signal.

When the receiver apparatus receives program signals different in frequency band, there needs to amplify or attenuate the program signals by the amplification unit and the first to third filter units. This is because the signal levels vary among the frequencies depending on the environment around the receiver apparatus, and the received program signals are to be changed to be in a predetermined level, i.e., changed to be in a level that can be demodulated by the demodulation unit. When the maximum reception frequency of a program signal is considerably different from the minimum reception frequency thereof, and when the relatively large number of program signals different in frequency band are to be received at the same time, there may be cases where the received program signals cannot be amplified or attenuated by the amplification unit and the first to third filter units to be in a predetermined signal level. With this being the case, the dynamic range of the receiver apparatus is reduced.

In consideration thereof, in the aspect of the invention, the passing frequency bandwidth of the first filter unit is so controlled as to be either of the above-mentioned two frequency bandwidths whichever is smaller. This accordingly stops any signal showing a large difference between the maximum and minimum reception frequencies going through the components disposed on the downstream of the first filter unit, thereby preventing the dynamic range from being reduced in the receiver apparatus. The amplification unit and the first to third filter units are no more required to amplify or attenuate the level of the program signals so that the load of such a process can be reduced for the amplification unit and the first to third filter units. This thus enables to reduce the power consumption as much as possible in the amplification unit and the first to third filter units.

In still another aspect of the invention, the receiver apparatus further includes another mixer unit and another local oscillator which are provided on the downstream of the amplification unit and on the upstream of the splitting unit, wherein the another local oscillator is capable of generating an oscillation signal, and the another mixer unit mixes the program signal outputted from the amplification unit and the oscillation signal generated by the another local oscillator to generate a mixed signal.

According to the invention, another mixer unit and another local oscillator are disposed on the downstream of the amplification unit but on the upstream of the splitting unit. The another mixer unit mixes a program signal coming from the amplification unit and an oscillation signal generated by the another local oscillator to generate a mixed signal. The mixed signal generated by the another mixer unit as such is split by the splitting unit for every channel. In the mixer unit disposed on the down stream of the splitting unit, the oscillation signal generated by the local oscillator is mixed with the mixed signals as a result of splitting by the splitting unit for every channel so that new mixed signals are generated. The resulting mixed signals are transmitted to the conversion unit via the gain control unit and the second filter unit.

As described above, the another mixer unit disposed on the downstream of the amplification unit but on the upstream of the splitting unit subjects the program signal to frequency conversion to derive a mixed signal. The resulting mixed signal is of a frequency suiting the conversion unit, being closer to a predetermined frequency than the frequency of the program signal. Thereafter, the mixer unit disposed on the downstream of the splitting unit subjects the mixed signal to frequency conversion to derive a new mixed signal. The new mixed signal is of a frequency suiting the conversion unit, being closer to the predetermined frequency than the frequency of the mixed signal. This enables to bring the frequency of the received program signal, i.e., required frequency, to the predetermined frequency suiting the conversion unit so that the signal of a frequency suiting the conversion unit can be provided to the conversion unit.

Therefore, for the process of making the signals as a result of splitting by the splitting unit in the second filter each have a frequency suiting the conversion unit, there is no need to insure high precision so that the load of the process can be reduced for the second filter unit. What is more, the conversion unit is provided with a signal of a frequency suiting the conversion unit, i.e., a level-stabilized signal. This thus eliminates the need for the conversion unit to go through predetermined signal processing for stabilizing the signal level so that the load of the signal processing can be reduced.

As such, the second filter unit and the conversion unit can be reduced in power consumption as much as possible.

In still another aspect of the invention, the mixer unit is configured by a passive mixer circuit, and the another mixer unit is configured by an active mixer circuit.

According to the invention, the mixer unit disposed on the downstream of the splitting unit is configured by a passive mixer circuit, and the another mixer unit disposed on the downstream of the amplification unit but on the upstream of the splitting unit is configured by an active mixer circuit. The active mixer circuit is used to subject the program signal to frequency conversion to derive a mixed signal, and the passive mixer circuit disposed on the downstream of the splitting unit subjects the mixed signal to frequency conversion to derive a new mixed signal, different from the mixed signal. This enables to stabilize the level of the new mixed signal to be a predetermined signal level, e.g., to the signal level to be able to demodulated by the demodulation unit.

By transmitting the mixed signal stabilized in signal level by the first signal processing unit to the second signal processing unit, the conversion unit and the third filter unit are not required to go through the signal processing for stabilizing the signal level so that the load of the signal processing can be reduced. As such, the conversion unit and the third filter unit can be reduced in power consumption as much as possible.

The invention is also directed to an information recording/outputting apparatus equipped with the receiver apparatus mentioned above.

According to the invention, an information recording/outputting apparatus equipped with the receiver apparatus as described above can be implemented so that the resulting information recording/outputting apparatus can realize the effects as described above.

The invention is directed to an information recording/outputting apparatus that receives program information provided from a broadcasting station for a plurality of channels, and records and outputs the received program information, comprising:

a tuner module section capable of receiving the program information via an antenna, for acquiring electronic program guide information which is transmitted together with the program information from the broad casting station;

a storage medium for storing the program information;

an operation section for specifying any desired one of the program information; and a control section for generating recording program information that represents program information to be recorded onto the recording medium based on the electronic program guide information acquired by the tuner module section and the program information specified by the operation section, and, based on the generated recording program information, reserving a recording capacity of the recording medium and making the recording medium selectively record thereon the desired program information.

According to the invention, the tuner module section receives program information about programs coming from a broadcasting station for a plurality of channels via an antenna and acquires electronic program guide information coming from the broadcasting station together with the program information. The operation section is operated by a user, for example, and specifies any program information desired by the user. Based on the electronic program guide information acquired by the tuner module section and the program information specified by the operation section, control section generates the recording program information, which represents the program information to be recorded on a recording medium. Based on the generated recording program information, the control section reserves the recording capacity of the recording medium, and any desired program information is selectively recorded on the recording medium.

The recording medium is recorded with the program information desired by the user selectively from the program information coming from the broadcasting station. This accordingly eliminates the need for the user to make setting of the apparatus for recording a program as is required with the related art. Unlike the related art, even when making the setting of the apparatus for recording the program is forgotten, it is made possible to secure recording the program.

The recording medium is recorded with the program information desired by the user so that the user can view the program information with relative ease and swiftness by an output of the program information recorded on the recording medium to a television receiver or others. This enables, with relative ease and certainty, the user to view the part of the program information he or she failed to watch even when the user starts to watch in the middle to the program. The apparatus can be thus increased in operability and convenience for the user's use.

The recording medium is recorded with the program information while the recording capacity is reserved in the recording medium so that the recording medium can be effectively used. This enables to prevent the possibility of inconvenience that any user's desired program information is not recorded on the recording medium due to the insufficient recording capacity of the recording medium.

In an aspect of the invention, based on the program information specified by the operation section and the electronic program guide information most recently acquired by the tuner module section, the control section generates the recording program information.

According to the invention, based on the program information specified by the operation section and the electronic program guide information acquired most recently by the tuner module section, the recording program information is generated by the control section. Even when the contents of the program information are changed due to broadcasting of a special program or the extended broadcasting time, such contents change made to the program information is reflected for recording of the program information on the recording medium while the consistency is provided between the most recent electronic program guide information and its corresponding program information. When the user views the program information recorded on the recording medium, this thus accordingly prevents the inconvenience of the program information not matching the program information desired by the user, in other words, prevents such inconsistency from occurring. The user thus becomes able to view any desired program information with certainty so that the user's convenience for use can be improved to a further degree.

In another aspect of the invention, the tuner module section receives the program information sharing the same contents for the channels, the program information at least includes image information that represents an image, and the control section makes the recording medium record thereon, with different compression ratios among the channels for the image represented by the image information, the program information that shares the same contents among the channels and is received by the tuner module section.

According to the invention, the tuner module section receives the program information sharing the same contents among a plurality of channels. The control section makes the recording medium record thereon, with different compression ratios among the channels for the image represented by the image information, the program information that shares the same contents among the channels and is received by the tuner module section. As such, the recording medium is recorded with a plurality of pieces of program information the same in contents but different in compression ratio among the channels for the image information in the program information.

As such, when the user wants to record, on an external recording medium such as magnetic recording medium or optical recording medium, any specific program information including the image information recorded on the recording medium, the user only needs to select the program information of any desired compression ratio. With this being the case, the external recording medium can be easily recorded with the program information of a compression ratio in consideration of the available recording capacity thereof. As such, when the user wants to record the program information recorded on the recording medium to any external recording medium, it is not necessary to perform a process for changing the image quality level of the image information in the program information to the user's desired level, and a process for compressing the program information with a compression ratio based on the recording capacity of the external recording medium. This thus enables to shorten the time required for the process of recording the program information recorded on the recording medium onto any other external recording medium so that the user's convenience for use can be improved to a further degree.

In still another aspect of the invention, when the program information received by the tuner module section is audio multiplexed program information in which a plurality of pieces of audio information are multiplexed for broadcasting, the control section makes the recording medium record thereon the audio multiplexed program information for each of the plurality of pieces of the audio information.

According to the invention, when the program information received by the tuner module section is audio multiplexed program information in which a plurality of pieces of audio information are multiplexed for broadcasting, the control section makes the recording medium record thereon the audio multiplexed program information for each of the plurality of pieces of the audio information, e.g., for each of the sets of audio information based on a plurality of languages. When the user views the audio multiplexed program information recorded on the recording medium, the user is no more required to perform an operation for switching languages from one to another. Only by selecting the audio information of any desired language, the user can easily view the audio multiplexed program information including the audio information of his or her selected language.

For recording of the audio multiplexed program information onto an external recording medium such as magnetic recording medium or optical recording medium, the user is no more required to set in advance the language to the audio information for recording onto the external recording medium. Accordingly, only by selecting the audio information of any desired language, it is possible to easily record, on the external recording medium, the audio multiplexed program information including the audio information of his or her selected language.

In still another aspect of the invention, the information recording/outputting apparatus further includes an information control edition section for collectively controlling a plurality of pieces of program information the same in contents but different in compression ratio for the image, and the audio multiplexed program information.

According to the invention, the information control edition section collectively controls a plurality of pieces of program information the same in contents but different in image compression ratio, and the audio multiplexed program information. Such information is all recorded on the recording medium. As such, for outputting any specific program information, and for editing the program information, it becomes possible to extract any desired program information and audio multiplexed program information with relative ease and swiftness selectively from a plurality of pieces of program information and audio multiplexed program information recorded on the recording medium. This accordingly improves the user's convenience for use.

In still another aspect of the invention, the control section makes an information-displayable output device display thereon at least either the program information or the audio multiplexed program information under the collective control by the information control edition section.

According to the invention, the control section displays information on an output device available for display. The information to be displayed is at least either the program information or the audio multiplexed program information collectively controlled by the information control edition section. As such, when the user wants to view at least either the program information or the audio multiplexed program information recorded on the recording medium, and want store cord the information on any external recording medium, by looking at the information displayed on the output device, the user can select at least either any desired program information or any desired audio multiplexed program information easily and swiftly. This thus favorably increases the user's convenience for use.

In still another aspect of the invention, the recording medium is provided with first and second recording media that can be recorded with the program information, and when the program information received by the tuner module section for the channels is recorded on the first recording medium, and any desired program information is specified by the operation section, the control section makes the second recording medium record thereon the program information specified by the operation section selectively from the program information recorded on the first recording medium.

According to the invention, the recording medium is provided with first and second recording media, which can record thereon the program information. When the first recording medium is recorded with the program information received by the tuner module section for a plurality of channels, and any desired program information is specified by the operation section, the program information specified by the operation section is recorded onto the second recording medium by the control section selectively from the program information recorded on the first recording medium. Herein, any desired program information is temporarily recorded on the first recording medium, which takes charge of recording every program information received by the tuner module section. Thereafter, the desired program information is recorded, for storage, on the second recording medium that is provided separately from the first recording medium. With such a configuration, even when the program information recorded on the first recording medium is lost due to failure of the first recording medium or the user's negligence, the user's desired program information remains intact.

In still another aspect of the invention, the information recording/outputting apparatus further includes:

a decoder section for decoding the program information recorded on the first recording medium, and outputting the resulting decoded information;

an information processing section for extracting at least either audio information or image information from the decoded information outputted from the decoder section;

a related information generation section for generating related information in which the decoded information outputted from the decoder section is related to search information, which is any one of identification information for user identification, and the audio and image information extracted by the information processing section for use as a search key by a user to search the program information; and an encoder section for encoding the related information generated by the related information generation section, and outputting the resulting encoded related-information, wherein the control section makes the second recording medium record thereon the encoded related-information outputted from the encoder section.

According to the invention, the decoder section decodes the program information recorded on the first recording medium, and outputs the resulting decoded information. From the decoded information outputted from the decoder section, the information processing section extracts at least either the audio information or the image information. The related information generation section generates related information in which the decoded information outputted from the decoder section is related to search information, which is any one of the identification information for user identification, and the audio and image information extracted by the information processing section for use as a search key by a user to search the program information. The encoder section encodes the related information generated by the related information generation section, and outputs the resulting encoded related-information. The control section makes the second recording medium record thereon the encoded related-information outputted from the encoder section.

When the related information in which the decoded information is related to the identification information being the search information is recorded on the second recording medium after encoding, even when the apparatus is used by a plurality of users, the users can be identified based on the identification information being the search information so that the program information can be swiftly displayed to each corresponding user. With such display of the program information, the users can easily and swiftly select the program information whichever they want to view. As such, the users can view desired program information immediately so that the users' convenience can be increased for use.

When the related information in which the decoded information is related to the audio or image information being the search information is recorded on the second recording medium after encoding, the audio or image information being the search information related to the decoded information is displayed to the user. For selecting any wanting program information, with the audio information displayed as such, the user listens to the audio information to select any desired program information, and with the image information, the user looks at the image information. This thus enables the user to select his or her desired program information with relative ease and swiftness. As such, the user can view desired program information immediately so that the users' convenience can be increased for use.

In still another aspect of the invention, the information processing section splits the decoded information into a plurality of pieces of partial decoded information, the image information is configured to include still image information that represents a still image, the information processing sect-ion extracts a plurality of pieces of still image information from the decoded information at any predetermined time intervals, and splits the decoded information at the predetermined time intervals same as those for extraction of the plurality of pieces of still image information, and the related information generation section generates the related information in which each of pieces of partial decoded information split by the information processing section is related to search information, which is each of pieces of still image information extracted by the information processing section.

According to the invention, the image information includes still image information that represents a still image. The information processing section extracts the still image information from the decoded information at any predetermined time intervals. The information processing section splits the decoded information into a plurality of pieces of partial decoded information at the predetermined time intervals same as those for extraction of the plurality of pieces of still image information. The related information generation section generates the related information in which each of pieces of partial decoded information split by the information processing section to the search information, which is each of pieces of still image information extracted by the information processing section. This related information is encoded by the encoder section, and the resulting encoded related-information is outputted. The encoded related-information is recorded onto the second recording medium by the control section.

The encoded related-information recorded on the second recording medium is subjected to reading of the plurality of pieces of still image information, which is each related to the partial decoded information and serves as the search information. With display of such still image information, the user becomes able to select immediately the still image information corresponding to the program information for any specific part he or she wants to view. As such, with relative ease and swiftness, the user can view the program information corresponding to the selected still image information, more specifically, the program information of a part he or she wants to view. This favorably can increase the user's convenience to a considerable degree.

In still another aspect of the invention, the control section judges whether or not a switching of the plurality of pieces of audio information is made from one to another, and when the control section judges that the audio information switching is made from one to another, the information processing section extracts the still image information from the decoded information, and splits the decoded information.

According to the invention, the control section judges whether or not an audio information switching is made from one to another, e.g., from stereo sound to monophonic sound. When the control section judges that the audio information switching is made from one to another, the information processing section extracts the still image information from the decoded information, and splits the decoded information. The related information generation section generates related information in which the partial decoded information split by the information processing section is related to the search information, which is the still image information extracted by the information processing section. The related information is encoded by the encoder section, and the resulting encoded related-information is outputted. The encoded related-information is recorded on the second recording medium by the control section.

For output of the program information, the still image information is read out from the encoded related-information recorded on the second recording medium to be displayed to the user. The still image information to be read out as such is the one being the search information related to the decoded information, and the one obtained when the control section judges that the audio information switching is made from one to another. With such display of the still image information, the user can select immediately the still image information corresponding to the program information of any specific part he or she wants to view. The program information selected by the user is outputted from the point in time of the audio information switching.

As such, the audio information is not outputted at some midpoint, e.g., in the middle of a sentence, so that the user never feel it difficult to understand what is going on in the program information. What is more, with relative ease and swiftness, the user can view the program information corresponding to his or her selected still image information, i.e., the program information of any specific part he or she wants to view. This thus increases the user's convenience to a considerable further degree for use.

In still another aspect of the invention, the related information is derived by relating the decoded information outputted from the decoder section to the search information, which is the still image information extracted by the information processing section, the operation section defines a total number of the related information in which the still image information is related to the decoded information, and the control section determines whether or not to use the still image information as the search information to be related to the decoded information based on the total number of the related information defined by the operation section.

According to the invention, the related information is derived by relating the decoded information outputted from the decoder section to the search information, which is the still image information extracted by the information processing section. The operation section defines the total number of the related information in which the still image information is related to the decoded information. The control section determines whether or not to use the still image information as the search information related to the decoded information, based on the total number of the related information defined by the operation section.

When the total number of the related information recorded on the second recording medium is smaller than the total number of the related information defined by the operation section, the still image information is used as the search information. When the total number of the related information recorded on the second recording medium is equal to or larger than the total number of the related information defined by the operation section, the search information will be information, the amount of which is smaller than the still image information, e.g., text information.

As such, by determining whether or not to use the still image information as the search information for the related information based on the total number of the related information defined by the operation section, it is possible to prevent information amount of the search information to be related to the decoded information from increasing. This enables to minimize the recording capacity required for the related information to be recorded on the second recording medium after encoding. This thus prevents occurrence of inconvenience that any program information cannot be recorded on the second recording medium due to the insufficient recording capacity thereof. The free space of the second recording medium can be thus reserved so that the second recording medium can be effectively used.

In still another aspect of the invention, the control section detects the free space of the second recording medium, and based on the detected free space, the control section controls the related information generation section to generate the related information using, as the search information, at least any one of the identification information, the audio information, and the still image information.

According to the invention, the control section detects the free space of the second recording medium. Based on the detected free space, the control section controls the related information generation section in such a manner as to generate the related information using, as the search information, at least any one of the identification information, the audio information, and the still image information. When the control section detects that the remaining free space of the second recording medium is relatively small, the related information generation section generates the related information with the search information, the amount of which is relatively small, e.g., identification information. When the control section detects that the remaining free space of the second recording medium is relatively large, the related information generation section generates the related information with the search information, the amount of which is relatively large, e.g., still image information.

As described in the foregoing, by changing the information for use as the search information depending on the remaining free space of the second recording medium, the free space of the second recording medium can be effectively used.

BRIEF DESCRIPTION OF THE DRAWINGS

Other and further objects, features, and advantages of the invention will be more explicit from the following detailed description taken with reference to the drawings wherein.

DETAILED DESCRIPTION

Figure 1:
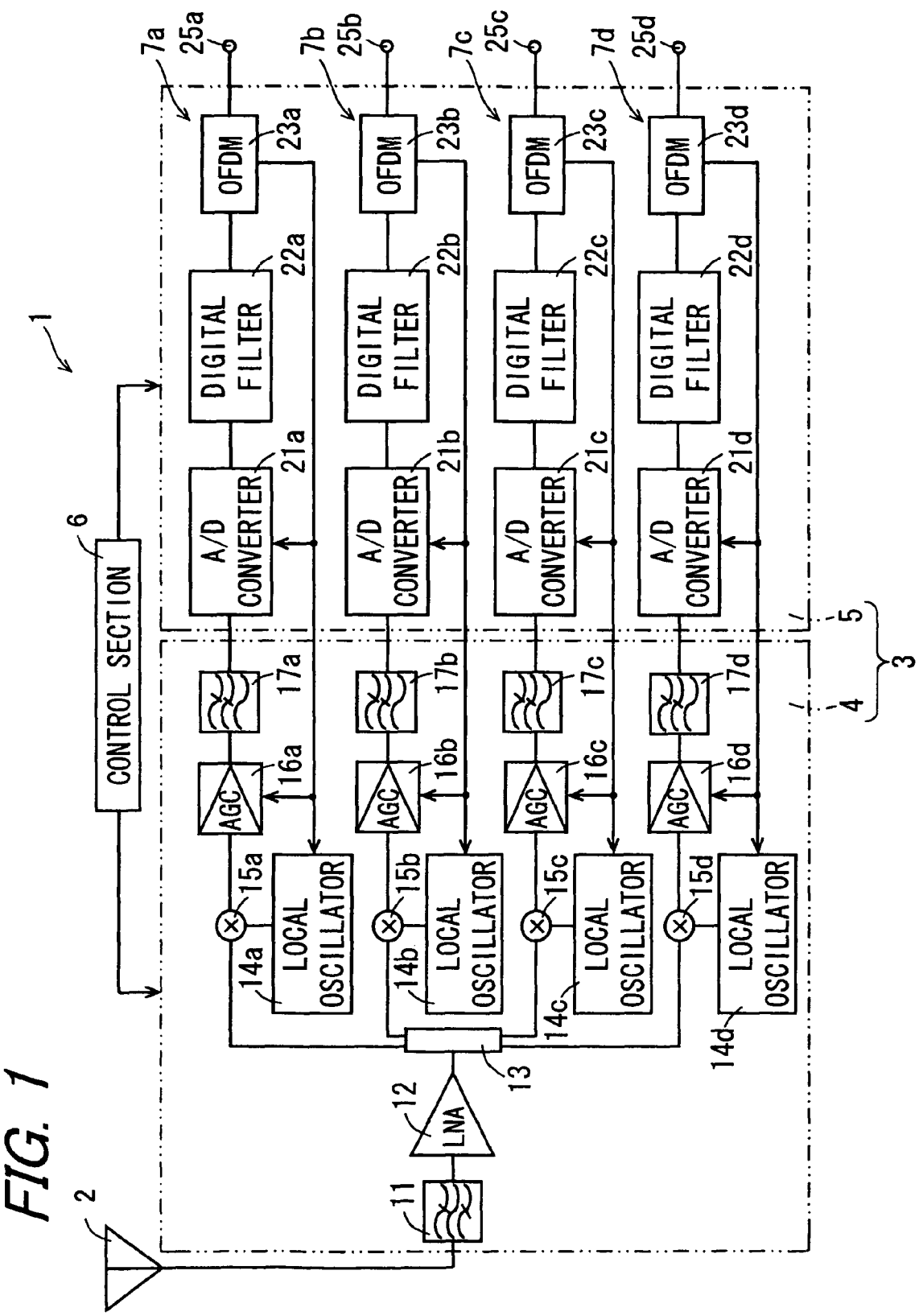
FIG. 1 is a block diagram showing the configuration of a receiver apparatus according to a first embodiment of the invention.

Now referring to the drawings, preferred embodiments of the invention are described below.

In the below, a plurality of embodiments of the invention are described. In the embodiments, any components corresponding to details described in any of the embodiments preceding thereto are provided with the same reference numerals and may not be described again. When only a part of the configuration is described, it means the remaining configuration is the same as any of the embodiments preceding thereto.

FIG. 1 is a block diagram showing the configuration of a receiver apparatus 1 according to a first embodiment of the invention. The receiver apparatus 1 is configured to include a tuner module section 3, and a control section 6. The tuner module section 3 includes a first signal processing unit 4, and a second signal processing unit 5.

The first signal processing unit 4 is configured by a semiconductor integrated circuit (IC), and includes a band pass filter (BPF) section 11, a low noise amplifier (LNA) 12, a splitter 13, a first local oscillator 14a, a second local oscillator 14b, a third local oscillator 14c, a fourth local oscillator 14d, a first mixer unit 15a, a second mixer unit 15b, a third mixer unit 15c, a fourth mixer unit 15d, a first automatic gain control (AGC) section 16a, a second AGC section 16b, a third AGC section 16c, a fourth AGC section 16d, a first low pass filter (LPF) section 17a, a second LPF section 17b, a third LPF section 17c, and a fourth LPF section 17d.

The second signal processing unit 5 is configured by an IC, and includes a first analog/digital (A/D) converter 21a, a second A/D converter 21b, a third A/D converter 21c, a fourth A/D converter 21d, a first digital filter section 22a, a second digital filter section 22b, a third digital filter section 22c, a fourth digital filter section 22d, a first orthogonal frequency division multiplexing (OFDM) demodulation section (hereinafter, occasionally simply referred to as "demodulation section") 23a, a second demodulation section 23b, a third demodulation section 23c, and a fourth demodulation section 23d.

The tuner module section 3 of this embodiment includes a first tuner section 7a, a second tuner section 7b, a third tuner section 7c, and a fourth tuner section 7d. The first tuner section 7a includes the first local oscillator 14a, the first mixer unit 15a, the first AGC section 16a, the first LPF section 17a, the first A/D converter 21a, the first digital filter section 22a, and the first demodulation section 23a. The second tuner section 7b includes the second local oscillator 14b, the second mixer unit 15b, the second AGC section 16b, the second LPF section 17b, the second A/D converter 21b, the second digital filter section 22b, and the second demodulation section 23b.

The third tuner section 7c includes the third local oscillator 14c, the third mixer unit 15c, the third AGC section 16c, the third LPF section 17c, the third A/D converter 21c, the third digital filter section 22c, and the third demodulation section 23c. The fourth tuner section 7d includes the fourth local oscillator 14d, the fourth mixer unit 15d, the fourth AGC section 16d, the fourth LPF section 17d, the fourth A/D converter 21d, the fourth digital filter section 22d, and the fourth demodulation section 23d.

The first to fourth tuner sections 7a to 7d share the same configuration, and thus only the first tuner section 7a is described in this embodiment. The description of the second to fourth tuner sections 7b to 7d will be omitted. In the below, for collectively referring to the first to fourth tuner sections 7a to 7d, and the components configuring the first to fourth tuner sections 7a to 7d, no such expression as "first", "second", "third", and "fourth" may be made, and no such subscript as "a", "b", "c", and "d" may be provided.

In this embodiment, the first filter unit is equivalent to the BPF section 11. The amplification unit is equivalent to the LNA 12. The gain control section is equivalent to the AGC section 16. The second filter unit is equivalent to the LPF section 17. The conversion unit is equivalent to the A/D converter 21. The third filter unit is equivalent to the digital filter section 22. The demodulation unit is equivalent to the OFDM demodulation section 23.

The antenna 2 is connected to the BPF section 11 of the first signal processing unit 4, and the BPF section 11 is connected to the LNA 12. The LNA 12 is connected to the splitter 13. The splitter 13 and the local oscillator 14 are both connected to the mixer unit 15. The mixer unit 15 is connected to the AGC section 16, and the AGC section 16 is connected to the LPF section 17. The LPF section 17 is connected to the A/D converter 21 of the second signal processing unit 5. The A/D converter 21 is connected to the digital filter section 22, which is connected to the demodulation section 23. The demodulation section 23 is connected to a demodulation signal output terminal section 25. The demodulation section 23 is connected also to the local oscillator 14, the AGC section 16, and the A/D converter 21. The control section 6 is connected to both the first and second signal processing units 4 and 5.

The antenna 2 captures broadcast waves coming from broadcasting satellites (BS), communication satellites (CS), and ground antennas. The broadcast waves include program signals relating to programs on a plurality of channels. The program signal includes two types of signal; one is a signal of program information including image information and audio information representing the program contents, and the other is a signal representing electronic program guide (EPG) information offering a broadcast channel list, contents of programs on the air or scheduled to be aired, and a function of easy search and programming for any desired program.

The BPF section 11 eliminates any program signal of unwanted frequency from the program signals relating to the programs on a plurality of channels in the broadcast waves captured by the antenna 2, and passes therethrough any program signal of a predetermined first frequency band and provides the resulting program signal to the LNA12. The LNA12 amplifies the program signal provided from the BPF section 11 and provides the resulting amplified signal to the amplifier 13. The LNA 12 is provided for the aim of reducing deterioration of a signal-to-noise ratio observed on the downstream of the LNA 12 even with a weak signal. The splitter 13 splits the program signal provided from the LNA 12 for every channel and provides the resulting split signal to the mixer unit 15 of the tuner section 7.

The local oscillator 14 generates an oscillation signal of a predetermined oscillation frequency suiting the frequency of the program signal provided to the mixer unit 15, and provides the resulting oscillation signal to the mixer unit 15. Such signal generation is based on a control signal coming from the demodulation section 23, which will be described later. The mixer unit 15 generates a mixed signal having a different frequency from the program signal, and provides the resulting mixed signal to the AGC section 16. The mixed signal is generated by mixture, more specifically, multiplication, between the program signal provided from the splitter 13 and the oscillation signal provided from the local oscillator 14.

The AGC section 16 controls the amplification ratio of the amplifier, i.e., gain, to be variable. Such control is applied based on the control signal provided from the demodulation section 23, which will be described later, and is so exercised that the mixed signal becomes constant in level for output even when the mixed signal provided from the mixer unit 15 changes in level. The AGC section 16 provides the resulting mixed signal to the LPF section 17. The LPF section 17 eliminates any mixed signal of unwanted frequency from the mixed signal provided from the AGC section 16, and passes therethrough any mixed signal of a second frequency band, which is equal to or lower than a predetermined cutoff frequency. The resulting mixed signal is provided to the A/D converter 21 of the second signal processing unit 5.

Based on the control signal provided from the demodulation section 23 that will be described later, the A/D converter 21 converts the analog mixed signal coming from the LPF section 17 to a digital signal. The resulting digital signal is provided to the digital filter section 22. The digital filter section 22 is implemented by either a finite impulse response (FIR) filter or an infinite impulse response (IIR) filter. The digital filter section 22 eliminates any digital signal of unwanted frequency from the digital signal provided from the A/D converter 21, and passes therethrough any digital signal of a predetermined third frequency band and provides the resulting digital signal to the demodulation section 23. The digital filter section 22 eliminates any noise that cannot be fully eliminated in the first signal processing unit 4.

The demodulation section 23 demodulates the digital signal provided from the digital filter section 22, and outputs a program signal. The program signal provided from the demodulation section 23 is outputted from the demodulation signal output terminal section 25. The program signal is provided, for example, to the first encoder section 115 of an information recording/outputting apparatus 100, which will be described later.

The demodulation section 23 provides a control signal to the local oscillator 14. The control signal is for use for generating an oscillation signal of an oscillation frequency suiting to convert the program signal to a digital signal that can be demodulated by the demodulation section 23. The demodulation section 23 provides a control signal to the AGC section 16 for signal level adjustment in an analog signal area to derive any predetermined signal level for the signal, which is to be transmitted to the A/D converter 21. The demodulation section 23 provides, to the A/D converter 21, a command of conversion into a digital signal suiting the demodulation scheme for the demodulation section 23, and a control signal for signal level adjustment in a digital signal area.

The control section 6 is implemented by including a central processing unit (CPU), for example. The control section 6 exercises control over the first and second signal processing units 4 and 5 in the tuner module section 3 by following a control program stored inside. More in detail, the control section 6 exercises collective control over the tuner section 7 including the local oscillator 14, the mixer unit 15, the AGC section 16, the LPF section 17, the A/D converter 21, the digital filter section 22, the demodulation section 23, the BPF section 11, and the LNA 12.

To the first and second signal processing units 4 and 5, the control section 6 provides an operation signal representing which of the tuner sections 7, i.e., first to fourth tuner sections 7a to 7d, is to be operated, or an operation stop signal representing which of the tuner sections 7 is to be stopped in operation. When receiving an operation signal from the control section 6, the first and second signal processing units 4 and 5 operate any of the tuner sections 7, i.e., first to fourth tuner sections 7a to 7d, based on the operation signal. When receiving an operation stop signal from the control section 6, the first and second signal processing units 4 and 5 stop the operation of any of the tuner sections 7, i.e., first to fourth tuner sections 7a to 7d, based on the operation stop signal.

The control section 6 can provide, to the BPF section 11, a bandwidth change command of changing the passing frequency bandwidth of the BPF section 11 to a passing frequency bandwidth provided from an input unit, which is not shown. The passing frequency bandwidth of the BPF section 11 can be changed based on such the bandwidth change command coming from the control section 6.

The control section 6 can provide, to the A/D converter 21, a conversion signal level change command of changing the conversion signal level of the A/D converter 21, i.e., sampling frequency of the A/D converter 21 to a sampling frequency provided from the input unit that is not shown. The conversion signal level of the A/D converter 21 can be changed based on such the conversion signal level change command coming from the control signal 6.

The control section 6 can provide, to the digital filter section 22, a frequency band change command of changing the passing signal level of the digital filter section 22, i.e., frequency band of a signal passing through the digital filter section 22, to a frequency band input by the input unit that is not shown. The passing signal level of the digital filter section 22 can be changed based on such the frequency band change command coming from the control section 6.

The control section 6 provides, to the BPF section 11, a bandwidth control signal for changing the passing frequency bandwidth of the BPF section 11 to a new frequency bandwidth. The new frequency bandwidth is either the frequency bandwidth of twice or smaller than the minimum reception frequency of the program signal, or the frequency bandwidth of half or smaller than the maximum reception frequency of the program signal, whichever is smaller. Based on such a bandwidth control signal coming from the control section 6, the BPF section 11 changes the passing frequency bandwidth to be either the frequency bandwidth of twice or smaller than the minimum reception frequency of the program signal, or the frequency bandwidth of half or smaller than the maximum reception frequency of the program signal, whichever is smaller.

As described above, according to the first embodiment of the invention, the first and second signal processing units 4 and 5 are each configured by a semiconductor integrated circuit. Therefore, compared with the configuration of the related art in which a plurality of tuner sections 7 are disposed in line with shielded by a metal cabinet, the receiver apparatus 1 with the first and second signal processing units 4 and 5 can be occupied less by the circuit. What is more, the received program signal is split by the splitter 13 in the first signal processing unit 4 configured by an IC, thereby reducing the signal transmission loss in the first signal processing unit 4.

Therefore, the impedance can be uniform in level in the first signal processing unit 4. Unlike the related art, in a correction circuit provided for correcting the splitting loss, the component values of individual components do not vary in absolute value that much any more.

With the smaller-sized circuit in the receiver apparatus 1, the signal path can be shortened from the BPF section 11 receiving the program signals from the broadcasting station to the demodulation section 23 compared with the related art. This enables to reduce the transmission loss on the signal path compared with the related art, and the signals coming over the signal path can be prevented from fluctuation in signal level so that the signal transmission can be performed with relative stability.

With the shorter signal path as such, the possible route for noise entering from the outside to the first and second signal processing units 4 and 5 can be accordingly made as short as possible. This thus enables to reduce the noise entering from the outside, and prevents the signals coming over the signal path from being attenuated by the noise so that the signal reception sensitivity can be increased.

With the related art, the individual high-frequency components are so disposed as to increase the signal reception sensitivity. On the other hand, in this embodiment, no such individual high-frequency component is required to increase the signal reception sensitivity. Accordingly, compared with the related art, the number of components can be reduced in the receiver apparatus so that the manufacturing cost and the power consumption can be both reduced.

According to the first embodiment of the invention, at least any one of the passing frequency bandwidth of the BPF section 11, the conversion signal level of the A/D converter 21, and the passing signal level of the digital filter section 22 is configured to be able to change. More in detail, the transmission scheme predetermined by the control section 6, e.g., 8VSB (Vestigial Sideband Modulation) or COFDM (Coded Orthogonal Frequency Division Multiplexing), is used as a basis to change any one of the passing frequency bandwidth, the conversion signal level, and the passing signal level. The passing frequency bandwidth of the BPF section 11 is 400 MHz, for example.

As such, since the passing frequency bandwidth, the conversion signal level, and the passing signal level are variable based on the transmission scheme, the signals going through the components in the first and second signal processing units 4 and 5 can be prevented from fluctuation in signal level so that the signal level can be favorably stabilized. In this embodiment, by including the A/D converter 21 and the digital filter section 22, the resulting signal level can be about 80 decibels.

With the signal level stabilized as such, in such components as the BPF section 11, the LNA 12, the LPF section 17, the A/D converter 21, and the digital filter section 22, there is no more need to go through predetermined signal processing for stabilizing the signal level so that the load of the signal processing can be reduced. This enables to reduce the power consumption as much as possible in such components as the BPF section 11, the LNA 12, the LPF section 17, the A/D converter 21, and the digital filter section 22.

According to the first embodiment of the invention, the BPF section 11 is so controlled by the control section 6 as to have the passing frequency bandwidth either the frequency bandwidth of twice or smaller than the minimum reception frequency of the program signal, or the frequency bandwidth of half or smaller than the maximum reception frequency of the program signal, whichever is smaller.

When the receiver apparatus 1 receives program signals different in frequency band, there needs to amplify or at tenuate the program signals by such components of the LNA 12, the BPF section 11, the LPF section 17, and the digital filter section 22. This is because the signal levels vary among the frequencies depending on the environment around the receiver apparatus 1, and the received program signals are to be changed to be in a predetermined level, more specifically, changed to be in a level that can be demodulated by the demodulation section 23.

When the maximum reception frequency of a program signal is considerably different from the minimum reception frequency thereof, and when the relatively large number of program signals different in frequency band are to be received at the same time, there may be cases where the received program signals cannot be amplified or attenuated by such components as the LNA 12, the BPF section 11, the LPF section 17, and the digital filter section 22 to be in a predetermined signal level. With this being the case, the dynamic range of the receiver apparatus 1 is reduced.

In consideration thereof, in this embodiment, the passing frequency bandwidth of the BPF section 11 is so controlled as to be either the frequency bandwidth of twice or smaller than the minimum reception frequency of the program signal, or the frequency bandwidth of half or smaller than the maximum reception frequency of the program signal, whichever is smaller. Through such control, this accordingly stops any signal showing a large difference between the maximum and minimum reception frequencies going through the components disposed on the downstream of the BPF section 11.

This accordingly prevents the dynamic range from being reduced in the receiver apparatus 1. There is thus no more need to amplify or attenuate the level of the program signal in such components as the LNA 12, the BPF section 11, the LPF section 17, and the digital filter section 22 so that the load of such a process can be reduced for the LNA 12, the BPF section 11, the LPF section 17, and the digital filter section 22. This thus enables to reduce the power consumption as much as possible in the LNA 12, the BPF section 11, the LPF section 17, and the digital filter section 22.

Figure 2:
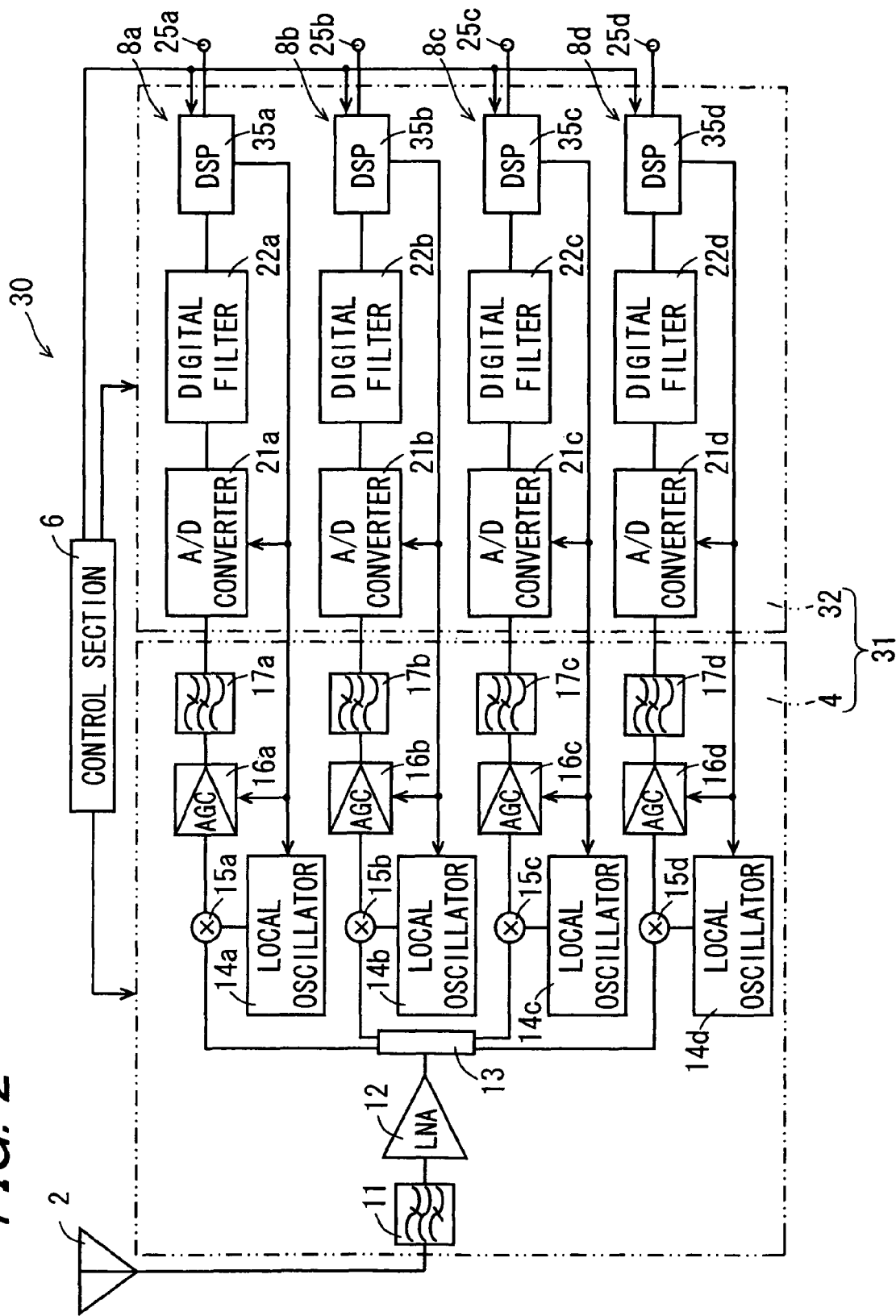
FIG. 2 is a block diagram showing the configuration of a receiver apparatus according to a second embodiment of the invention.

FIG. 2 is a block diagram showing the configuration of a receiver apparatus 30 according to a second embodiment of the invention. The receiver apparatus 30 of this embodiment is similar in configuration to the receiver apparatus 1 of the first embodiment. Therefore, only any different component will be described, and any similar component will be denoted by the same reference numeral and the description thereof will be omitted.

The receiver apparatus 30 is configured to include a tuner module section 31, and the control section 6. The tuner module section 31 includes the first signal processing unit 4, and a second signal processing unit 32. The second signal processing unit 32 is configured to include the first to fourth A/D converters 21a to 21d, the first to fourth digital filter sections 22a to 22d, a first digital signal processing apparatus (DSP) 35a, a second DSP 35b, a third DSP 35c, and a fourth DSP 35d.

The tuner module section 31 of this embodiment includes first to fourth tuner sections 8a to 8d. The first tuner section 8a includes the first local oscillator 14a, the first mixer unit 15a, the first AGC section 16a, the first LPF section 17a, the first A/D converter 21a, the first digital filter section 22a, and the first DSP 35a. The second tuner section 8b includes the second local oscillator 14b, the second mixer unit 15b, the second AGC section 16b, the second LPF section 17b, the second A/D converter 21b, the second digital filter section 22b, and the second DSP 35b.

The third tuner section 8c includes the third local oscillator 14c, the third mixer unit 15c, the third AGC section 16c, the third LPF section 17c, the third A/D converter 21c, the third digital filter section 22c, and the third DSP 35c. The fourth tuner section 8d includes the fourth local oscillator 14d, the fourth mixer unit 15d, the fourth AGC section 16d, the fourth LPF section 17d, the fourth A/D converter 21d, the fourth digital filter section 22d, and the fourth DSP 35d. In the below, for collectively referring to the first to fourth tuner sections 8a to 8d, and the components configuring the first to fourth tuner sections 8a to 8d, no such expression as "first", "second", "third", and "fourth" may be made, and no such subscript as "a", "b", "c", and "d" may be provided.

In this embodiment, the demodulation section is equivalent to the DSP 35.

The digital filter section 22 of the second signal processing unit 32 is connected to the DSP 35, which is connected to the demodulation signal output terminal section 25. The DSP 35 is connected to the local oscillator 14, the AGC section 16, and the A/D converter 21. The control section 6 is connected to the first and second signal processing units 4 and 32, and also to the DSP 35.

The digital filter section 22 eliminates any digital signal of unwanted frequency from digital signals provided from the A/D converter 21, and passes therethrough any digital signal of a predetermined third frequency band and provides the resulting digital signal to the DSP 35. The DSP 35 subjects the digital signal provided from the digital filter section 22 to demodulation by following a predetermined demodulation program, and outputs the program signal. The program signal provided from the DSP 35 is outputted from the demodulation signal output terminal section 25, and then provided to the first encoder section 115 of the information recording/outputting apparatus 100 described above.

The DSP 35 provides a control signal to the local oscillator 14. The control signal is for use for generating an oscillation signal of an oscillation frequency suiting to convert the program signal to a digital signal that can be demodulated by the DSP 35. The DSP 35 provides a control signal to the AGC section 16 for signal level adjustment in an analog signal area to derive any predetermined signal level for the signal, which is to be transmitted to the A/D converter 21. The DSP 35 provides, to the A/D converter 21, a command of conversion into a digital signal suiting the demodulation scheme for the DSP 35, and a control signal for signal level adjustment in a digital signal area.

The control section 6 issues, to the DSP 35, a program changing command of changing a predetermined demodulation program to an other demodulation program, and a program rewriting command of rewriting a demodulation program previously recorded on the DSP 35. The control section 6 provides the DSP 35 with demodulation program data representing a predetermined demodulation program for execution by the DSP 35. Based on such a program changing command coming from the control section 6, the DSP 35 changes the demodulation program from one to another. Based on such a program rewriting command and the demodulation program data coming from the control section 6, the DSP 35 also rewrites the demodulation program recorded on the DSP 35 to the demodulation program provided from the control section 6.

As described above, according to the second embodiment of the invention, the demodulation unit is configured by the DSP 35. The DSP 35 can change the demodulation program from one to another with relative ease based on a predetermined command provided from the control section 6, i.e., a command of changing the predetermined demodulation program to another. The DSP 35 can also rewrite the demodulation program recorded on the DSP 35 with relative ease based on a command provided from the control section 6, more specifically, a command of rewriting the demodulation program previously recorded on the DSP 35 to another, and the demodulation program data.

As such, by changing the demodulation program previously recorded on the DSP 35 based on the transmission scheme, the receiver apparatus 30 can demodulate any signal input to the DSP 35 with relative ease by following the demodulation program suiting the transmission scheme. The receiver apparatus 30 is not required to include any specific demodulation unit each for the transmission scheme. Therefore, compared with a case of including any specific demodulation unit, the manufacturing cost of the receiver apparatus 30 can be reduced.

By changing the demodulation program previously recorded on the DSP 35, various improvements become possible, e.g., solving vulnerability of the demodulation program.

Figure 3:
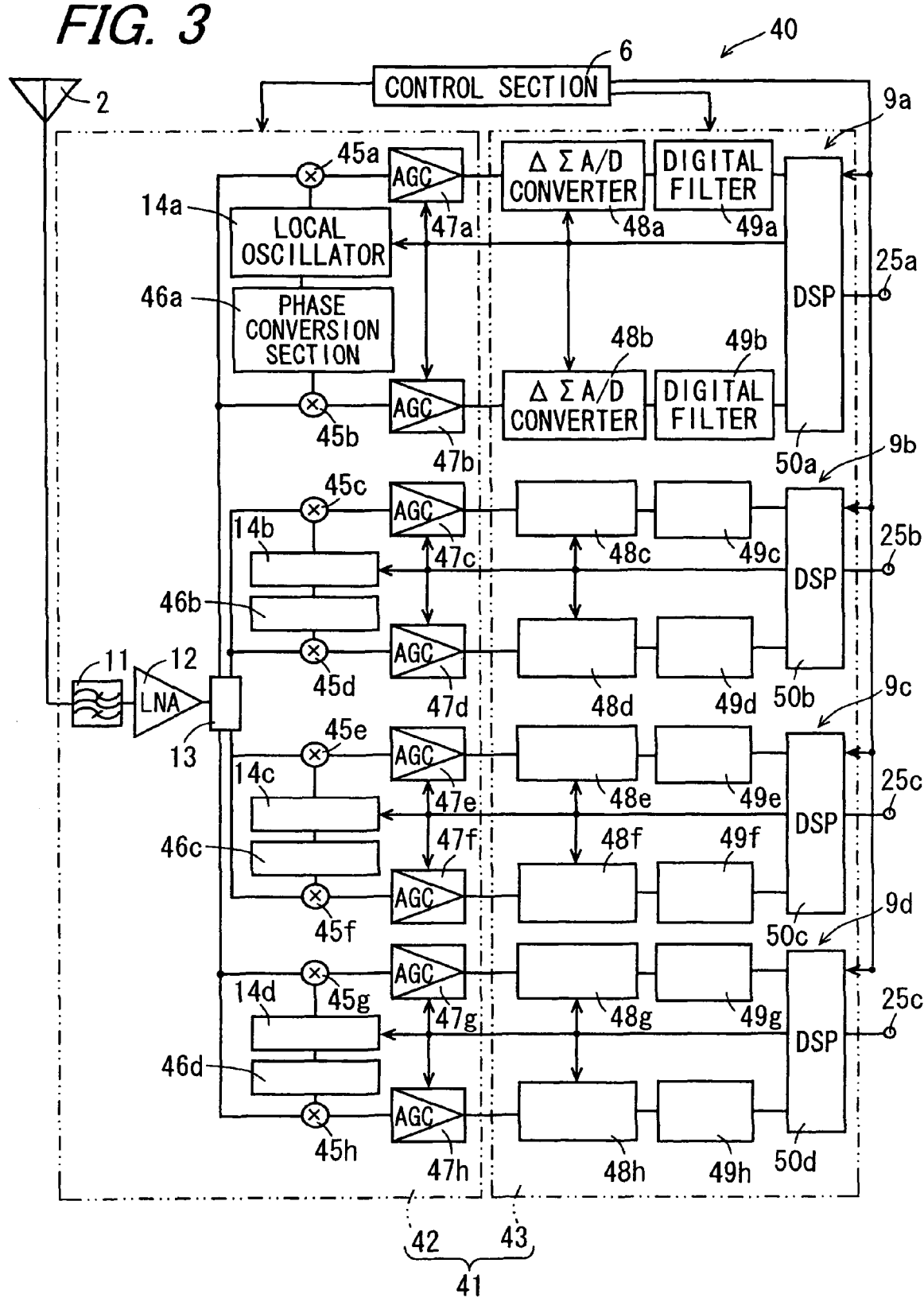
FIG. 3 is a block diagram showing the configuration of a receiver apparatus according to a third embodiment of the invention.

FIG. 3 is a block diagram showing the configuration of a receiver apparatus 40 according to a third embodiment of the invention. The receiver apparatus 40 is similar in configuration to the receiver apparatuses 1 and 30 of the first and second embodiments. Therefore, only any different component will be described, and any similar component will be denoted by the same reference numeral and the description thereof will be omitted.

The receiver apparatus 40 is configured to include a tuner module section 41, and the control section 6. The tuner module section 41 includes a first signal processing unit 42, and a second signal processing unit 43. The first signal processing unit 42 is configured by the BPF section 11, the LNA 12, the splitter 13, the first to fourth local oscillators 14a to 14d, first to eighth mixer units 45a to 45h, first to fourth phase converters 46a to 46d, and first to eighth AGC sections 47a to 47h. The second signal processing unit 43 includes first to eighth digital-sigma analog/digital (ΔΣ A/D) converters 48a to 48h, first to eighth digital filter sections 49a to 49h, and first to fourth DSPs 50a to 50d.

The tuner module section 41 of this embodiment includes first to fourth tuner sections 9a to 9d. The first tuner section 9a includes the first local oscillator 14a, the first and second mixer units 45a and 45b, the first phase converter 46a, the first and second AGC sections 47a and 47b, the first and second ΔΣ A/D converters 48a and 48b, the first and second digital filter sections 49a and 49b, and the first DSP 50a. The second tuner section 9b includes the second local oscillator 14b, the third and fourth mixer units 45c and 45d, the second phase converter 46b, the third and fourth AGC sections 47c and 47d, the third and fourth ΔΣ A/D converters 48c and 48d, the third and fourth digital filter sections 49c and 49d, and the second DSP 50b.

The third tuner section 9c includes the third local oscillator 14c, the fifth and sixth mixer units 45e and 45f, the third phase converter 46c, the fifth and sixth AGC sections 47e and 47f, the fifth and sixth ΔΣ A/D converters 48e and 48f, the fifth and sixth digital filter sections 49e and 49f, and the third DSP 50c. The fourth tuner section 9d includes the fourth local oscillator 14d, the seventh and eighth mixer units 45g and 45h, the fourth phase converter 46d, the seventh and eighth AGC sections 47g and 47h, the seventh and eighth ΔΣ A/D converters 48g and 48h, the seventh and eighth digital filter sections 49g and 49h, and the fourth DSP 50d.

The first to fourth tuner sections 9a to 9d share the same configuration, and thus only the first tuner section 9a is described in this embodiment. The description of the second to fourth tuner sections 9b to 9d will be omitted. In the below, for collectively referring to the first to fourth tuner sections 9a to 9d, and the components configuring the first to fourth tuner sections 9a to 9d, no such expression as "first", "second", "third", "fourth", "fifth", "sixth", "seventh" and "eighth" may be made, and no such subscript as "a", "b", c "d", "e", "f", "g" and "h" may be provided.

In this embodiment, the gain control unit is equivalent to the AGC section 47. The conversion unit is equivalent to the ΔΣ A/D converter 48. The third filter unit is equivalent to the digital filter section 49. The demodulation unit is equivalent to the DSP 50.

The splitter 13 of the first signal processing unit 42 is connected to both the first and second mixer units 45a and 45b. The first local oscillator 14a is connected to both the first mixer unit 45a and the first phase conversion section 46a. The first mixer unit 45a is connected to both the first local oscillator 14a and the first AGC section 47a, and the second mixer unit 45b is connected to both the first phase conversion section 46a and the second AGC section 47b.

The first AGC section 47a is connected to the first ΔΣ A/D converter 48a, and the second AGC section 47b is connected to the second ΔΣ A/D converter 48b. The first ΔΣ A/D converter 48a is connected to the first digital filter section 49a, and the second ΔΣ A/D converter 48b is connected to the second digital filter section 49b.

The first and second digital filter sections 49a and 49b are both connected to the first DSP 50a. The first DSP 50a is connected to the first demodulation signal output terminal section 25. The first DSP 50a is connected to the first local oscillator 14a, the first and second AGC sections 47a and 47b, and the first and second ΔΣ A/D converters 48a and 48b. The control section 6 is connected to both the first and second signal processing units 42 and 43, and also to the first DSP 50a.

The splitter 13 splits the program signal coming from the LNA 12, and provides the resulting split program signal to the first and second mixer units 45a and 45b for every channel. The first local oscillator 14a generates an oscillation signal of a predetermined oscillation frequency and provides the resulting oscillation signal to the first mixer unit 45a and the first phase conversion section 46a. The first mixer unit 45a generates a mixed signal having a different frequency from the program signal, and provides the resulting mixed signal to the first AGC section 47a. The mixed signal is generated by mixture, more specifically, multiplication, between the program signal provided from the splitter 13 and the oscillation signal provided from the first local oscillator 14a.

The first phase conversion section 46a converts the phase of the oscillation signal provided from the first local oscillator 14a by 90 degrees, more specifically, delays the phase by 90 degrees, and the resulting signal differs in phase by 90 degrees from the original oscillation signal. The resulting signal is provided to the second mixer unit 45b. The second mixer unit 45b generates a mixed signal having a different frequency from the program signal, and provides the resulting mixed signal to the second AGC section 47b. The mixed signal is generated by mixture, more specifically, multiplication, between the program signal provided from the splitter 13 and the signal provided from the first phase conversion section 46a.

The first AGC section 47a controls the amplification ratio of the amplifier, i.e., gain, to be variable. Such control is applied based on the control signal provided from the first DSP 50a, which will be described later, and is so exercised that the mixed signal becomes constant in level for output even when the mixed signal provided from the first mixer unit 45a changes in level. The first AGC section 47a provides the resulting mixed signal to the first ΔΣ A/D converter 48a.

The second AGC section 47b controls the amplification ratio of the amplifier, i.e., gain, to be variable. Such control is applied based on the control signal provided from the first DSP 50a, which will be described later, and is so exercised that the mixed signal becomes constant in level for output even when the mixed signal provided from the second mixer unit 45b changes in level. The second AGC section 47b provides the resulting mixed signal to the second ΔΣ A/D converter 48b.

The first ΔΣ A/D converter 48a subjects the mixed signal provided from the first AGC section 47a to sampling with a predetermined sampling frequency, and then converts an analog signal to a digital signal. The resulting digital signal is provided to the first digital filter section 49a. The second ΔΣ A/D converter 48b subjects the mixed signal provided from the second AGC section 47b to sampling with a predetermined sampling frequency, and then converts an analog signal to a digital signal. The resulting digital signal is provided to the second digital filter section 49b.

The first digital filter section 49a eliminates any digital signal of unwanted frequency from the digital signals provided from the first ΔΣ A/D converter 48a, and passes therethrough any digital signal of a predetermined third frequency band and provides the resulting digital signal to the first DSP 50a. The second digital filter section 49b eliminates any digital signal of unwanted frequency from the digital signals provided from the second ΔΣ A/D converter 48b, and passes therethrough any digital signal of a predetermined third frequency band, and provides the resulting digital signal to the first DSP 50a.

By following a predetermined demodulation program, the first DSP 50a goes through a demodulation process while comparing the digital signal provided from the first digital filter section 49a and the digital signal provided from the second digital filter section 49b. This increases the quality of the program information in the program signals to be provided from the first DSP 50a as compared with the first and second embodiments. The program signal provided from the first DSP 50a is outputted from the first demodulation signal output terminal section 25a, and is provided to the first encoder section 115 of the information recording/outputting apparatus 100 described above.

The first DSP 50a provides, to the first local oscillator 14a, a control signal for use for generating an oscillation signal of an oscillation frequency suiting to convert the program signal to a digital signal that can be demodulated by the first DSP 50a. The first DSP 50a provides a control signal to the first AGC section 47 for signal level adjustment in an analog signal area to derive any predetermined signal level for the signal, which is to be transmitted to the first ΔΣ A/D converter 48a. The first DSP 50a provides, to the second AGC section 47b, a control signal for signal level adjustment in an analog signal area to derive any predetermined signal level for the signal, to be transmitted to the second ΔΣ A/D converter 48b.

The first DSP 50a provides, to the first and second ΔΣ A/D converters 48a and 48b, a command of conversion in to a digital signal suiting the demodulation scheme for the first DSP 50a, and a control signal for signal level adjustment in a digital signal area.

The control section 6 issues, to the first DSP 50a, a program changing command of changing a predetermined demodulation program to another demodulation program, and a program rewriting command of rewriting a demodulation program previously recorded on the first DSP 50a. The control section 6 provides the first DSP 50a with demodulation program data representing a predetermined demodulation program for execution by the first DSP 50a. Based on such a program changing command coming from the control section 6, the first DSP 50a changes the demodulation program from one to another among a plurality of the demodulation programs. Based on such a program rewriting command and the demodulation program data provided from the control section 6, the first DSP 50a also rewrites the demodulation program recorded thereon to the demodulation program provided from the control section 6.

As described above, according to the third embodiment of the invention, the A/D converter is the ΔΣ A/D converter 48. By using such a ΔΣ A/D converter 48, the mixed signal provided from the AGC section 47 of the first signal processing unit 42 can be converted into a digital signal with high precision. In other words, it becomes possible to derive any highly precise digital signal with no influence of noise entering from the outside.

As such, for signal processing for eliminating any noise entering from the outside into such components of the BPF section 11, the LNA 12, and the digital filter section 49, there is no need to insure high precision so that the load of the signal processing can be decreased in the BPF section 11, the LNA 12, and the digital filter section 49. This accordingly decreases the power consumption as much as possible in the BPF section 11, the LNA 12, and the digital filter section 49.

According to the third embodiment of the invention, the mixer unit 45 directly subjects the high-frequency program signal to frequency conversion by direct conversion to derive a low-frequency mixed signal. When direct conversion is not adopted, the local oscillator 14 generates an oscillation signal of a frequency suiting the ΔΣ A/D converter 48, and the mixer unit 45 mixes the oscillation signal with the program signal, thereby requiring to convert the frequency of the received program signal into the frequency suiting the ΔΣ A/D converter 48. With such a frequency conversion scheme, any signal of unwanted frequency may be converted and mixed with the program signal. There thus needs to eliminate any signal of unwanted frequency.

On the other hand, in the third embodiment of the invention, the high-frequency program signal is directly converted into a low-frequency mixed signal, so that any signal of unwanted frequency can be prevented, as much as possible, from being mixed to the program signal after conversion. As such, in this embodiment, this favorably prevents any signal of unwanted frequency from being mixed to the program signal after conversion so that there is no more need to include such a filter unit as described above to eliminate any signal of unwanted frequency. Accordingly, compared with the case of including such a filter unit as described above for eliminating any signal of unwanted frequency, the number of components can be decreased in the receiver apparatus, and the power consumption can be favorably reduced.

Figure 4:
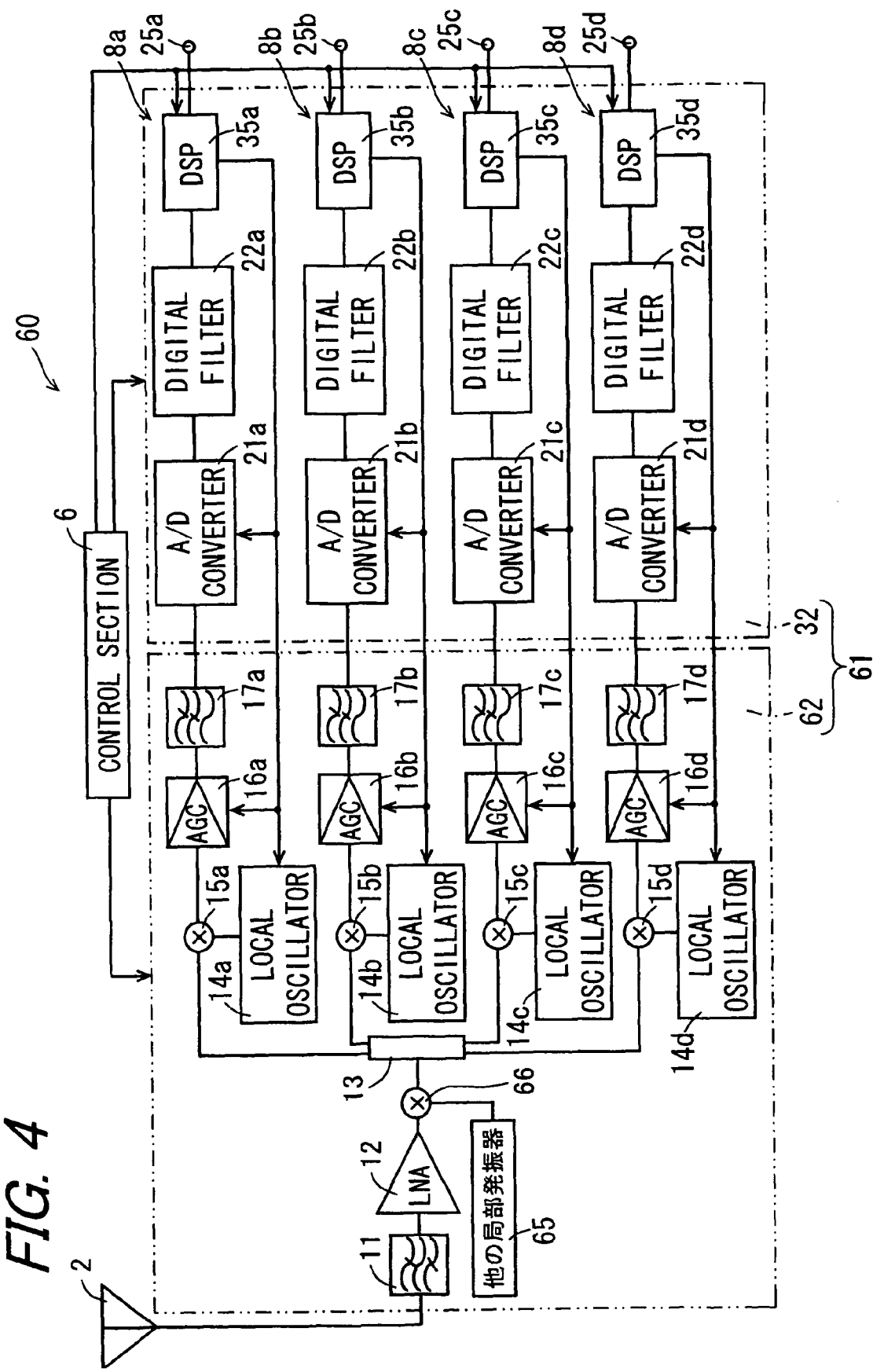
FIG. 4 is a block diagram showing the configuration of a receiver apparatus according to a fourth embodiment of the invention.

FIG. 4 is a block diagram showing the configuration of a receiver apparatus 60 according to a fourth embodiment of the invention. The receiver apparatus 60 of this embodiment is similar in configuration to the receiver apparatus 30 of the second embodiment. Therefore, only any different component will be described, and any similar component will be denoted by the same reference numeral and the description thereof will be omitted.

The receiver apparatus 60 is configured to include a tuner module section 61, and the control section 6. The tuner module section 61 includes a first signal processing unit 62, and the second signal processing unit 32. The fist signal processing unit 62 includes the BPF section 11, the LNA 12, the splitter 13, the first to fourth local oscillators 14a to 14d, the first to fourth mixer units 15a to 15d, the first to fourth AGC sections 16a to 16d, the first to fourth LPF sections 17a to 17d, another local oscillator 65, and another mixer unit 66. The tuner module section 61 includes the first to fourth tuner sections 8a to 8d. In the below, for collectively referring to the first to fourth tuner sections 8a to 8d, and the components configuring the first to fourth tuner sections 8a to 8d, no such expression as "first", "second", "third", and "fourth" may be made, and no such subscript as "a", "b", "c", and "d" may be provided.

In this embodiment, The gain control section is equivalent to the AG section 16. The demodulation section is equivalent to the DSP 35.

The LNA 12 of the first signal processing unit 62 is connected to the another mixer unit 66. The another mixer unit 66 is connected to both the another local oscillator 65 and the splitter 13. The another local oscillator 65 is connected to the another mixer unit 66. The another local oscillator 65 and the another mixer unit 66 are disposed on the downstream of the LNA 12 buton the upstream of the splitter 13. The splitter 13 is connected to the mixer unit 15 of the tuner section 8 disposed on the downstream of the splitter 13. In this embodiment, the another mixer unit 66 is configured by an active mixer circuit, and the mixer unit 15 is configured by a passive mixer circuit.

The LNA 12 amplifies the program signal provided from the BPF section 11 and provides the resulting amplified program signal to the another mixer unit 66. The another local oscillator 65 generates an oscillation signal of a predetermined oscillation frequency suiting the frequency of the program signal provided to the another mixer unit 66, and provides the resulting oscillation signal to the another mixer unit 66. Such signal generation is made based on a control signal provided from the DSP 35, which will be described later. The another mixer unit 66 generates a mixed signal having a different frequency from the program signal, and provides the resulting mixed signal to the splitter 13. The mixed signal is generated by mixture, more specifically, multiplication, between the program signal provided from the LNA 12 and the oscillation signal provided from the another local oscillator 65.

The splitter 13 splits the mixed signal provided from the another mixer unit 66, and provides the resulting split signal to the mixer unit 15 of the tuner sections 8a to 8d for every channel. The mixer unit 15 newly generates a mixed signal having a different frequency from the mixed signal provided from the splitter 13, and provides the resulting mixed signal to the AGC section 16. This new mixed signal is generated by mixture, more specifically, multiplication, between the mixed signal provided from the splitter 13 and the oscillation signal provided from the local oscillator 14 connected to the mixer unit 15. The signal processing on the downstream of the AGC section 16 of the tuner section 8 is similar to the first embodiment above.

As described above, according to the fourth embodiment of the invention, the another mixer unit 66 disposed on the downstream of the BPF section 11 but on the upstream of the splitter 13 subjects the program signal to frequency conversion to derive a mixed signal of a frequency closer to a predetermined frequency suiting the A/D converter 21 better than the frequency of the program signal. Thereafter, the mixer unit 15 disposed downstream of the splitter 13 subjects the mixed signal to frequency conversion to derive a new mixed signal of a frequency closer to the predetermined frequency suiting the A/D converter 21 better than the frequency of the mixed signal.

This enables to easily bring the frequency of the received program signal, i.e., received frequency, closer to the predetermined frequency suiting the A/D converter 21 so that the signal of a frequency suiting the A/D converter 21 can be provided to the A/D converter 21. Therefore, for a process of making the signals as a result of splitting by the splitter 13 in the LPF section 17 each have a frequency suiting the A/D converter 21, there is no need to insure high precision so that the load of the process by the LPF section 17 can be reduced. What is more, the A/D converter 21 is provided with a signal of a frequency suiting the A/D converter 21, i.e., a level-stabilized signal. This thus eliminates the need for the A/D converter 21 to go through predetermined signal processing for stabilizing the signal level so that the load of the signal processing can be reduced.

As such, the LPF section 17 and the A/D converter 21 can be reduced in power consumption as much as possible. In this embodiment, the received program signal is reduced in frequency to $1/10$ through such frequency conversion so that the power consumption can be also reduced to $1/10$ in the LPF section 17 and the A/D converter 21.

According to the fourth embodiment of the invention, the another mixer unit 66 disposed on the downstream of the LNA 12 but on the upstream of the splitter 13 is configured by an active mixer circuit, and the mixer unit 15 disposed on the downstream of the splitter 13 is configured by a passive mixer circuit. In this embodiment, the another mixer unit 66 configured by an active mixer circuit subjects the program signal to frequency conversion to derive a mixed signal, and the mixer unit 15 configured by a passive mixer circuit subjects the mixed signal to frequency conversion to derive a new mixed signal, different from the mixed signal. This enables to stabilize the level of the new mixed signal to a predetermined signal level, e.g., to the signal level to be able to be demodulated by the DSP 35.

By transmitting the mixed signal stabilized in signal level by the first signal processing unit 62 as such to the second signal processing unit 32, the A/D converter 21 and the digital filter section 22 are not required to go through the signal processing for stabilizing the signal level so that the load of the signal processing can be reduced. As such, the A/D converter 21 and the digital filter section 22 can be reduced in power consumption as much as possible.

In this embodiment, in the another mixer unit 65 configured by an active mixer circuit, the received program signal is reduced in frequency to $1/10$, for example. With this being the case, the power consumption can be also reduced to $1/10$ in the A/D converter 21 and the digital filter section 22 in the second signal processing unit 32.

The tuner module sections 3, 31, 41, and 61 in the above embodiments are each provided with two signal processing units, i.e., the fist signal processing units 4, 42, 62, and the second signal processing units 5, 32, and 43, respectively. With such a configuration of the tuner module sections each including the first and second signal processing units, it becomes easy to take measures, for every signal processing unit, against any noise entering from the outside of the tuner module sections, and against any trouble occurred in the tuner sections.

The embodiments described above are no more than examples of the invention, and it is understood that numerous other configurations can be devised without departing from the scope of the invention. In the above first, second, and fourth embodiments, the A/D converter 21 takes charge of converting an analog signal to a digital signal. Alternatively, in another embodiment of the invention the $\Delta\Sigma$ A/D converter may take charge of converting an analog signal to a digital signal.

In the fourth embodiment, the another mixer unit 66 is configured by an active mixer circuit, and the mixer unit 15 is configured by a passive mixer circuit. Alternatively, in another embodiment of the invention the another mixer unit 66 may be configured by a passive mixer circuit, and the mixer unit 15 may be configured by an active mixer circuit. This configuration can be also preferably embodied similarly to the fourth embodiment. Still alternatively, in another embodiment of the invention the another mixer unit 66 and the mixer unit 15 may be both configured by an active mixer circuit, and this configuration can be also preferably embodied similarly to the fourth embodiment.

Figure 5:
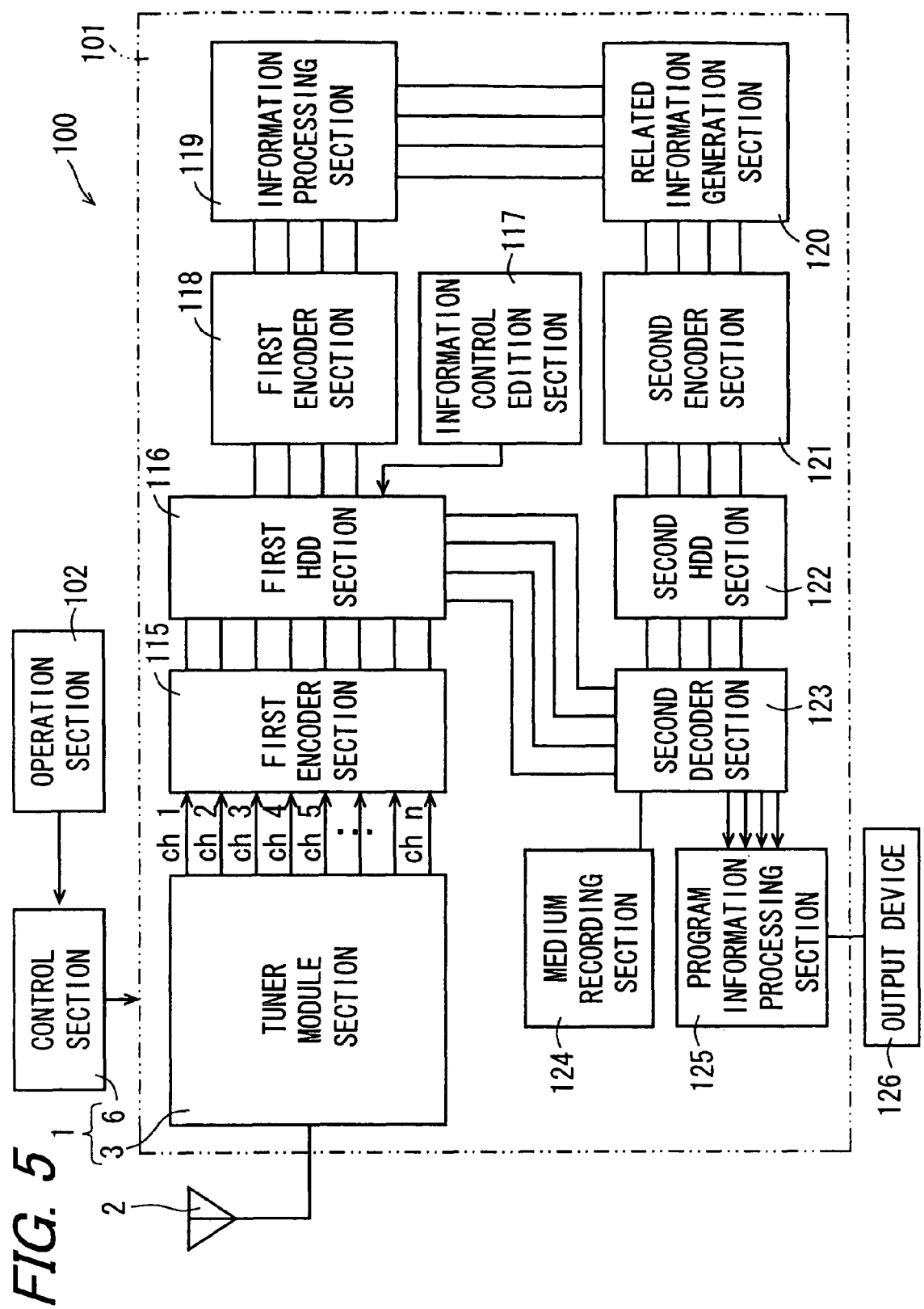
FIG. 5 is a block diagram showing the configuration of an information recording/outputting apparatus according to one embodiment of the invention.

Described next is the information recording/outputting apparatus 100 equipped with the receiver apparatus 1 of the embodiment. FIG. 5 is a block diagram showing the configuration of the information recording/outputting apparatus 100 according to one embodiment of the invention. The information recording/outputting apparatus 100 is equipped with the receiver apparatus 1. The information recording/outputting apparatus 100 receives program signals about programs coming from a broadcasting station for a plurality of channels via the antenna 2. The received program signals for a plurality of channels represent program information and EPG information, which are recorded on a recording medium such as hard disk drive for output.

The information recording/outputting apparatus 100 is configured to include an information recording/outputting apparatus body 101, an operation section 102, and the control section 6. The information recording/outputting apparatus body 101 includes the tuner module section 3, a first encoder section 115, a first hard disk drive (hereinafter, occasionally referred to as "first HDD") section 116, an information control edition section 117, a first decoder section 118, an information processing section 119, a related information generation section 120, a second encoder section 121, a second hard disk drive (hereinafter, occasionally referred to as "second HDD") section 122, a second decoder section 123, a medium recording section 124, and a program information processing section 125.

The first signal processing unit 4 in the tuner module section 3 receives a plurality of broadcast waves captured by the antenna 2, and demodulates the plurality of broadcast waves received, thereby acquiring program information about programs on a plurality of channels (in this embodiment, "n" channels (where "n" is a natural number of two or more)), and electronic program guide (EPG) information. The EPG information offers a broadcast channel list, contents of programs on the air or scheduled to be aired, and a function of easy search and programming for any desired program. The first signal processing unit 4 provides the acquired program information and EPG information to the second signal processing unit 5.

The second signal processing unit 5 applies A/D conversion to the EPG information and the program information for the plurality of channels provided from the first signal processing unit 4 so that the analog signal is converted into a digital signal. The second signal processing unit 5 provides, to the first encoder section 115, the EPG information and the program information for the plurality of channels through with A/D conversion.

More particularly, the program signal demodulated by the demodulation section 23 of the tuner module section 3 is provided to the first encoder section 115 via the demodulation signal output terminal sections 25*a* to 25*d*. The first encoder section 115 encodes the program information for the plurality of channels represented by the program signal provided from the tuner module section 3. More in detail, the first encoder section 115 compresses the image information of the program information for the plurality of channels by MPEG (Moving Picture Experts Group), for example, and compresses also the audio information of the program information by MPEG, for example. The first encoder section 115 provides, to the first HDD section 116, the EPG information represented by the program signals provided from the tuner module section 3, and the program information encoded for a plurality of channels.

The first HDD section 116 includes an EPG information recording area, a program information recording area, and an input information recording area. The EPG information recording area is recorded with the EPG information provided from the first encoder section 115. The program information recording area is recorded with the encoded program information provided from the first encoder section 115 for a plurality of channels. The input information recording area is recorded with input information as a result of operation of the operation section 102, which will be described later. The first HDD section 116 provides the EPG information recorded in the EPG information recording area to the second decoder section 123. The first HDD section 116 also provides the encoded program information recorded in the program information recording area for a plurality of channels to either the first or second decoder section 118 or 123.

The information control edition section 117 collectively controls the program information whichever sharing the same contents in the first HDD section 116. The information control edition section 117 edits the program information recorded on the first HDD section 116, i.e., deletes any unwanted program information partially or entirely. Such edition is made based on a control signal provided from the control section 6. The first decoder section 118 decodes the encoded program information provided from the first HDD section 116 so that decoded information is generated. The first decoder section 118 provides thus generated decoded information to the information processing section 119.

From the decoded information provided from the first decoder section 118, the information processing section 119 extracts at least either the image information or the audio information. The extraction result is provided to the related information generation section 120. From the decoded information provided from the first decoder section 118, the information processing section 119 extracts a plurality of pieces of still image information at predetermined time intervals, and the extraction results are provided to the related information generation section 120. The information processing section 119 splits the decoded information at predetermined time intervals same as those for extraction of the still image information. The resulting decoded information is provided to the related information generation section 120.

When determining that the control section 6 performs an audio information switching from one to another, the information processing section 119 extracts the still image information from the decoded information and provides the stil image information to the related information generation section 120. The information processing section 119 also splits the decoded information into a plurality of pieces of partial decoded information, and provides the resulting partial decoded information to the related information generation section 120.

The related information generation section 120 uses at least any one of three information as the search information, i.e., identification information for user identification, and the image and audio information provided from the information processing section 119. The search information represents a search key for use by a user to search the program information. The search information is related to the decoded information generated by the first decoder section 118 through decoding so that related information is generated. The identification information may be a user's name, or an ID (Identification) number assigned to every user. In this embodiment, in response to the user's operation on the operation section 102, at least any one of the identification information, and the image and audio information provided from the information processing section 119 is input so that the search information is defined.

The related information generation section 120 uses the plurality of pieces of still image information provided from the information processing section 119 as the search information, and generates related information by relating the search information to the plurality of pieces of partial decoded information provided from the information processing section 119. In other words, the related information generation section 120 generates the related information in which the plurality of pieces of still image information is related to the plurality of pieces of partial decoded information. Herein, the still image information is those extracted by the information processing section 119 from the decoded information at predetermined time intervals, and the decoded information is those derived by splitting the decoded information at predetermined time intervals same as those for extraction of the still image information.

The related information generation section 120 uses, as the search information, at least either the image information or the audio information provided from the information processing section 119 based on the remaining free space detected for the second HDD section 22 by the control section 6, which will be described later. The search information is related to the plurality of pieces of partial decoded information provided from the information processing section 119 so that the related information is generated. The related information generation section 120 provides thus generated related information to the second encoder section 121.

The second encoder section 121 encodes the related information provided from the related information generation section 120, and generates encoded related-information. More in detail, the second encoder section 121 compresses the related information by MPEG, for example, and generates the encoded related-information. The second encoder section 121 provides the encoded related-information to the second HDD section 122.

The second HDD section 122 is recorded with the encoded related-information provided from the second encoder section 121. The second HDD section 122 provides the recorded encoded related-information to the second decoder section 123. The second decoder section 123 decodes the encoded related-information provided from the second HDD section 122 so that the related information is generated. The resulting related information is provided to at least either the medium recording section 124 or the program information processing section 125. The second decoder section 123 decodes the encoded program information provided from the first HDD section 116 for a plurality of channels. The resulting decoded program information is provided to at least either the medium recording section 124 or the program information processing section 125. The second decoder section 123 provides the EPG information provided from the first HDD section 116 to the program information processing section 125.

The medium recording section 124 is capable of recording the program information provided from the second decoder section 123 to optical recording media, e.g., compact disks (CDs), digital versatile disks (DVDs), and others.

The program information processing section 125 applies image processing to the related information and the decoded program information provided from the second decoder section 123. When receiving the EPG information from the second decoder section 123, the program information processing section 125 outputs the EPG information to an output device 126 provided outside of the information recording/outputting apparatus 100. Such output is made based on a command issued by the control section 6 that will be described later, i.e., command about the output of the EPG information. The output device 126 is implemented by a speaker that can output audio information, and a television receiver equipped with a display that can output image information.

When receiving the related information from the second decoder section 123, the program information processing section 125 outputs the search information to the output device 126. This output is made based on a command issued by the control section 6 that will be described later, i.e., command about the output of the search information included in the related information. Thereafter, based on another command issued by the control section 6 that will be described later, i.e., command about the output of any user-desired program information, the image and audio information of the user-desired program information is subjected to a process to be synchronized. The image and audio information is then provided to the output device 126.

When receiving the decoded program information from the second decoder section 123, the program information processing section 125 goes through a process of synchronizing the image and audio information of the user-desired program information, and outputs the image and audio information to the output device 126. The output is made based on a command issued by the control section 6 that will be described later, i.e., command about the output of the user-desired program information.

The operation section 102 includes a plurality of operation pieces such as operation key for user operation. In response to when any of the operation pieces are operated, the operation section 102 generates a signal and provides the resulting signal to the control section 6, which will be described later. The signal represents predetermined information about number, text, command to the information recording/outputting apparatus body 101, or others whichever corresponding to the operation. In this manner, the user can provide information to the information recording/outputting apparatus body 101 through operation of the operation pieces of the operation section 102. The operation section 102 of this embodiment is implemented by a remote controller, which can be remotely operated for issuing commands to the information recording/outputting apparatus body 101 over infrared communications, for example, to provide user-input information. In other embodiments of the invention, the operation section 102 may be equipped to the information recording/outputting apparatus body 101.

The control section 6 takes charge of exercising control in the receiver apparatus 1. The control section 6 exercises collective control over the hardware resources by following a control program stored inside of the CPU. The hardware resources include the components configuring the information recording/outputting apparatus body 101, i.e., the tuner module section 3, the first encoder section 115, the first HDD section 116, the information control edition section 117, the first decoder section 118, the information processing section 119, the related information generation section 120, the second encoder section 121, the second HDD section 122, the second decoder section 123, the medium recording section 124, and the program information processing section 125. Based on a signal coming from the operation section 102, the control section 6 exercises control over the operation of the information recording/outputting apparatus body 101, and the components configuring the information recording/outputting apparatus body 101 by providing thereto a control signal.

The control section 6 generates the recording program information representing the program information for recording to the first HDD section 116. Such information generation is made based on the program information specified by the user, i.e., any program information desired by the user, and the EPG information most recently acquired by the antenna 2 and the tuner module section 3. The recording program information is recorded to a recording section, which is not shown. After generating the recording program information in response to the information about the user-desired program information coming from the operation section 102, the control section 6 issues a command to the information recording/outputting apparatus body 101 based on the recording program information. The command is of making the second HDD section 122 record thereon the user-desired program information selectively from the program information recorded on the first HDD section 116. This enables to make the second HDD section 122 record thereon any user's desired program information selectively from the program information recorded on the first HDD section 116. The information actually recorded on the second HDD section 122 is the encoded related-information generated by the second encoder section 121.

The control section 6 issues another command to the information recording/outputting apparatus body 101. The command is of making the first HDD section 116 record thereon the program information with different compression ratios for an image represented by the image information for every channel. The program information is the one received by the tuner module section 3 via the antenna 2, and sharing the same contents among the plurality of channels. In this manner, the program information sharing the same contents among the channels can be recorded on the first HDD section 116 with different compression ratios for an image represented by the image information for every channel.

The control section 6 issues still another command to the program information processing section 125. The command is of making the output device 126 output at least either the program information or the audio multiplexed program information under the collective control of the information control edition section 117. This enables to output, to the output device 126, at least either the program information or the audio multiplexed program information, which are collectively controlled.

The control section 6 issues, to the program information processing section 125, a command of outputting the EPG information to the output device 126. This enables to output the EPG information to the output device 126. The control section 6 then issues, to the program information processing section 125, another command of outputting the search information in the related information to the output device 126. This enables to output the search information to the output device 126. The control section 6 then issues, also to the program information processing section 125, still another command of outputting any program information desired by the user to the output device 126. This enables to output the program information desired by the user to the output device 126.

As described in the foregoing, in the embodiment, the receiver apparatus 1 capable of reducing the manufacturing cost and the power consumption as such is equipped to the information recording/outputting apparatus 100 so that the resulting information recording/outputting apparatus 100 in which the manufacturing cost and the power consumption can be both reduced.

The control section 6 then determines whether or not an audio information switching is made from one to another for the program information. When determining that such an audio information switching is made by the control section 6 from one to another, the information processing section 119 extracts at least either the image information or the audio information from the decoded information.

After receiving from the operation section 102 the total number of the related information input to the operation section 102, based on the total number, the control section 6 determines whether or not to use the still image information as the search information to be related to the partial decoded information. The related information here is the one to be recorded on the second HDD section 122, and is the result of relating the still image information to the decoded information.

The control section 6 detects the remaining free space of the second HDD section 122. Based on the free space detected for the second HDD section 122, the control section 6 generates the related information with the search information being at least any one of the identification information, the audio information, and the still image information.

In this embodiment, the recording medium is equivalent to at least either the first or second recording medium. The first recording medium is equivalent to the first HDD section 116, and the second recording medium is equivalent to the second HDD section 122.

Figure 6:
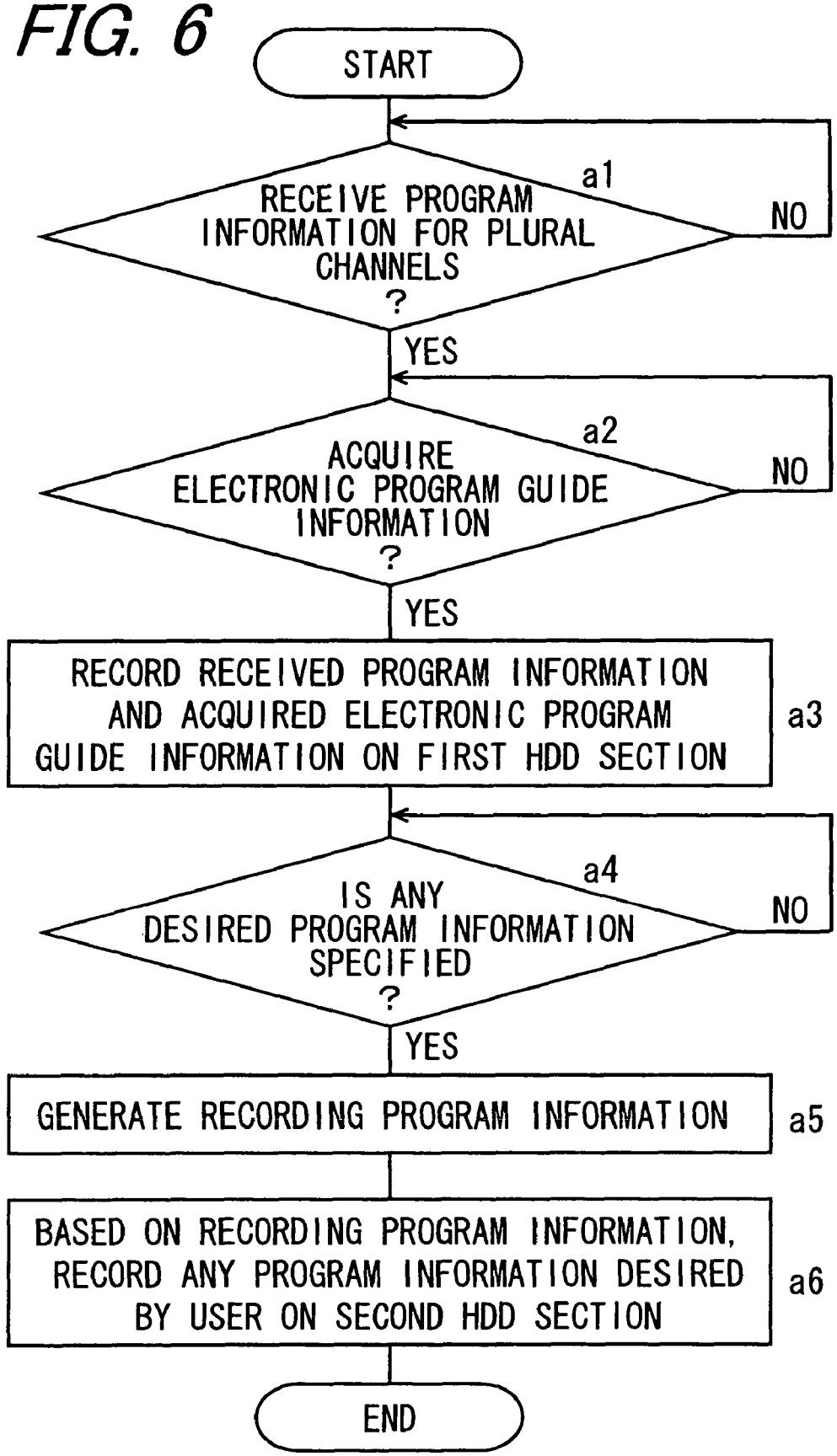
FIG. 6 is a flowchart showing the process procedure about the operation of the information recording/outputting apparatus.

FIG. 6 is a flowchart showing the process procedure about the operation of the control section 6 in the information recording/outputting apparatus 100. The process procedure about the operation of the control section 6 in the information recording/outputting apparatus 100 is started when the information recording/outputting apparatus 100 is turned on, for example. This process procedure is mainly controlled by the control section 6 unless otherwise specified.

In step a1, a determination is made whether the tuner module section 3 are receiving program information from a broadcasting station for a plurality of channels via the antenna 2. When the program information is being received, the procedure goes to step a2, and when not, the procedure waits until the program information is received.

In step a2, another determination is made whether the tuner module section 3 is acquiring electronic program guide information (hereinafter, occasionally simply referred to as "EPG information") coming from the broadcasting station. When the EPG information is being acquired, the procedure goes to step a3, and when not, the procedure waits until the EPG information is acquired.

In step a3, the first HDD section 116 is recorded with the program information received by the tuner module section 3 for a plurality of channels, and the EPG information acquired by the tuner module section 3. The procedure then goes to step a4.

In step a4, a determination is made whether a user is specifying any wanting program information through operation of the operation section 102. In other words, determined here is whether information is provided from the operation section 102 about the program information desired by the user. When such information is being provided, the procedure goes to step a5, and when not, the procedure waits until such information comes.

In step a5, based on the EPG information acquired in step a2, and the information about the user-desired program information provided from the operation section 102 in step a4, recording program information is generated. This recording program represents the program information to be recorded on the second HDD section 122. The procedure then goes to step a6.

In step a6, based on the recording program information generated in step a5, the user-desired program information is recorded on the second HDD section 122 selectively from the program information recorded on the first HDD section 116. This is the end of the procedure.

In the present embodiment, after the user-desired program information recorded on the first HDD section 116 is recorded on the second HDD section 122, the user-desired program information recorded on the first HDD section 116 is deleted.

As described in the foregoing, according to this embodiment, the first HDD section 116 is recorded with, together with the EPG information, the program information received by the tuner module section 3 for programs on a plurality of channels via the antenna 2. After the user-desired program information is specified through user operation of the operation section 102, the information about the desired program information is provided to the control section 6. The control section 6 then generates the recording program information representing the program information to be recorded on the second HDD section 122. Such information generation is made based on the EPG information recorded on the first HDD section 116, and the information about the desired program information provided from the operation section 102. Based on thus generated recording program information, the control section 6 records the user-desired program information on the second HDD section 122 selectively from the program information recorded on the first HDD section 116 for which the recording capacity is reserved on the recording medium.

As such, the second HDD section 122 is recorded with the user-desired program information selectively from the program information coming from the broadcasting station so that the user is no more required to program the apparatus to record programs as with the related art. Accordingly, in this embodiment, unlike the related art, even when making the setting of the apparatus for recording the program is forgotten, it is made possible to secure recording the program.

The second HDD section 122 is recorded with the user-desired program information so that the user can view the program information with relative ease and swiftness by an output of the program information recorded on the second HDD section 122 to the output device 126, e.g., television receiver. This enables, with relative ease and certainty, the user to view the part of the program he or she failed to watch even when the user starts to watch in the middle of the program. The apparatus can be thus increased in operability and convenience for the user's use.

The second HDD section 122 is recorded with the program information while the recording capacity is reserved therefor so that the second HDD section 122 can be effectively used. This enables to prevent the possibility of inconvenience that any user's desired program information is not recorded on the second HDD section 122 due to the insufficient recording capacity thereof.

As described in the foregoing, any desired program information is temporarily recorded on the first HDD section 116, which takes charge of recording every program information received by the tuner module section 3 via the antenna 2. Thereafter, the desired program information is recorded, for storage, on the second HDD section 122 that is provided separately from the first HDD section 116. With such a configuration, even when the program information recorded on the first HDD section 116 is lost due to failure of the first HDD section 116 or the user's negligence, the user's desired program information remains intact.

According to this embodiment, the recording program information is generated based on the program information desired by the user, and the EPG information acquired most recently by the tuner module section 3. The recording program information represents the program information to be recorded on the first HDD section 116. Even when the contents of the program information are changed due to broadcasting of a special program or the extended broadcasting time, such contents change made to the program information is reflected for recording of the program information on the first and second HDD sections 116 and 122 while the consistency is provided between the most recent electronic program guide information and its corresponding program information.

When the user views the program information recorded on the second HDD section 122, this thus accordingly prevents the inconvenience of the program information not matching the program information desired by the user, in other words, prevents such inconsistency from occurring. The user thus becomes able to view any desired program information with certainty so that the user's convenience for use can be improved to a further degree.

Figure 7:
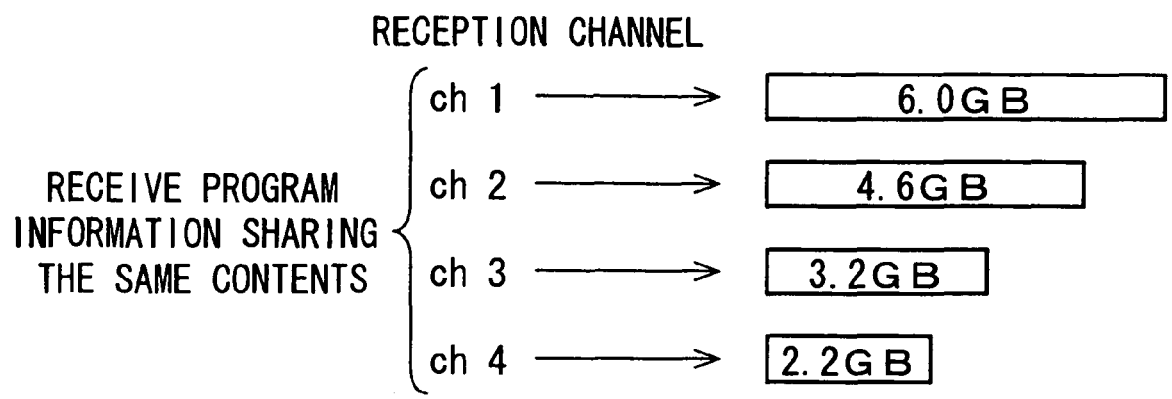
FIG. 7 is a diagram showing the channels for reception of program information sharing the same contents, and information amount of the program information for every channel.

FIG. 7 is a diagram showing the channels for reception of program information sharing the same contents, and information amount of the program information for every channel. In this embodiment, when the tuner module section 3 receives the program information sharing the same contents for a plurality of channels via the antenna 2, such program information is recorded on the first HDD section 116 with different compression ratios for an image represented by the image information by the first encoder section 115 for every channel. The image compression ratio may be set in advance by the user through operation of the operation section 102. The number of channels for receiving the program information sharing the same contents among a plurality of channels may be previously set by the user through operation of the operation section 102. In this embodiment, exemplified is a case with 4 channels (chs), more specifically, a case of receiving the same program information among the ch "1" to ch "4".

The program information for the ch"1" is recorded, without compression, on the first HDD section 116 with the information amount the same as when the information is received, i.e., 6 gigabytes (GB) in this embodiment. The program information for the ch "2" is recorded, after compressed, on the first HDD section 116 with the information amount of 4.6 GB, for example. The program information for the ch "3" is recorded, after compressed, on the first HDD section 116 with the information amount of 3.2 GB, for example. The program information for the ch "4" is recorded, after compressed, on the first HDD section 116 with the information amount of 2.2 GB, for example.

As such, according to this embodiment, a plurality of pieces of program information that are sharing the same contents, and received by the tuner module section 3 for a plurality of channels via the antenna 2 are recorded on the first HDD section 116 with different compression ratios for an image represented by the image information for every channel. Thereafter, when the user specifies the plurality of pieces of program information whichever sharing the same contents in the first HDD section 116, the plurality of pieces of program information the same in contents but different in compression ratio are recorded on the second HDD section 122. Accordingly, the first and second HDD sections 116 and 122 are both recorded with the program information the same in contents but different in compression ratio of the image information included in the program information for every channel.

As such, when the user wants to record, onto an external recording medium such as magnetic recording medium or optical recording medium, any specific program information recorded on the second HDD section 122, the user only needs to select the program information of any desired compression ratio. With this being the case, the external recording medium can be easily recorded with the program information of a compression ratio suiting the recording capacity thereof. As such, when the user wants to record any specific program information recorded on the second HDD section 122 to any other external recording medium, it is not necessary to perform a process for changing the image quality of the image information in the program information to the user's desired level, and a process for compressing the program information with a compression ratio based on the recording capacity of the external recording medium. This thus enables to shorten the time required for the process of recording the program information recorded on the second HDD section 122 onto any other external recording medium so that the user's convenience for use can be improved to a further degree.

Figure 8:
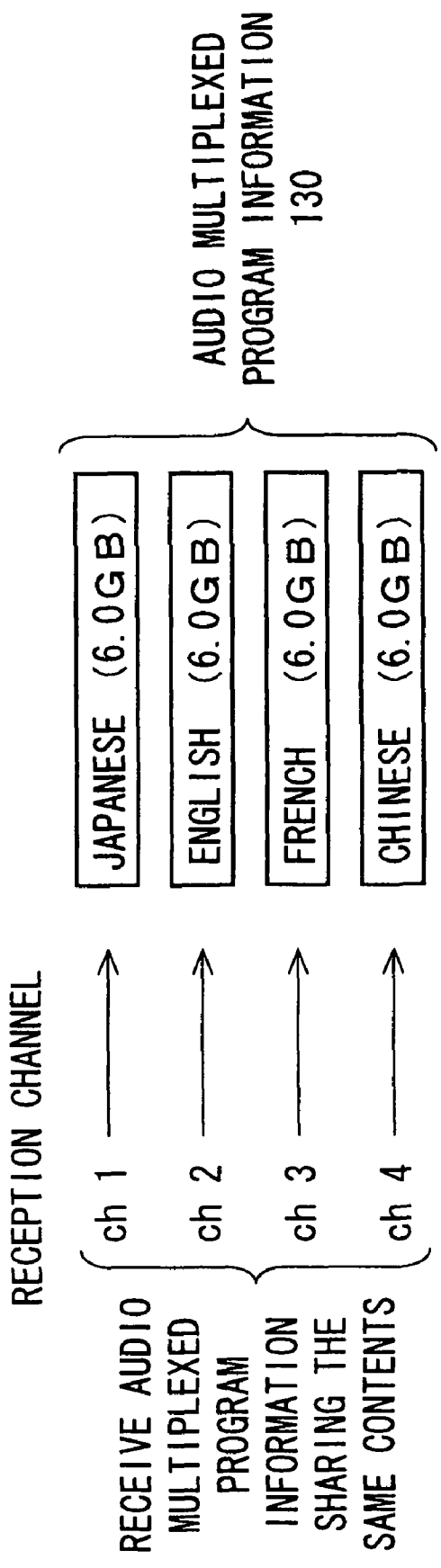
FIG. 8 is a diagram showing channels for receiving audio multiplexed program information and the audio multiplexed program information received for every language.

FIG. 8 is a diagram showing channels for receiving audio multiplexed program information and the audio multiplexed program information 130 for every language. In this embodiment, when the program information received by the tuner module section 3 for a plurality of channels via the antenna 2 is audio multiplexed program information in which a plurality of pieces of audio information different in language are multiplexed, the audio multiplexed program information is recorded on the first HDD section 116 for every audio information based on the language. In this embodiment, exemplified is a case of receiving the same audio multiplexed program information among four channels, more specifically, ch "1" to ch "4". The audio multiplexed program information in this embodiment is information in which four pieces of audio information in different languages, more specifically, Japanese, English, French, and Chinese, are multiplexed.

When the audio multiplexed program information is received via the antenna 2, the tuner module section 3 uses the first signal processing unit 4 to separate a plurality of pieces of multiplexed audio information from the audio multiplexed program information. Each of pieces of audio information as a result of separation is recorded on the first HDD section 116 together with the image information via each corresponding channel as a single piece of program information for every audio information.

For example, the audio multiplexed program information of 6 GB including the image information and the audio information of Japanese is recorded on the first HDD section 116 via the ch "1". The audio multiplexed program information of 6 GB including the image information and the audio information of English is recorded on the first HDD section 116 via the ch "2". The audio multiplexed program information of 6 GB including the image information and the audio information of French is recorded on the first HDD section 116 via the ch "3". The audio multiplexed program information of 6 GB including the image information and the audio information of Chinese is recorded on the first HDD section 116 via the ch "4".

As described in the foregoing, according to this embodiment, when the program information received by the tuner module section 3 via the antenna 2 is the audio multiplexed program information in which the plurality of pieces of audio information different in language are multiplexed, the audio multiplexed program information is recorded on the first HDD section 116 for every language of the audio information. Thereafter, when the user specifies at least one of the plurality of pieces of audio information different in language included in the plurality of pieces of audio multiplexed program information recorded on the first HDD section 116, the audio multiplexed program information including the specified audio information is recorded on the second HDD section 122.

When the user views the audio multiplexed program information recorded on the second HDD section 122, he or she is no more required to perform an operation for switching languages from one to another. The user only needs to select the audio information of any desired language, he or she can easily view the audio multiplexed program information including the audio information of his or her selected language.

For recording of the audio multiplexed program information onto an external recording medium such as magnetic recording medium or optical recording medium, the user is no more required to set in advance the language for the audio information for recording onto the external recording medium. Accordingly, only by selecting the audio information of any desired language, it is possible to easily record, onto an external recording medium, the audio multiplexed program information including the audio information of his or her selected language.

Figure 9:
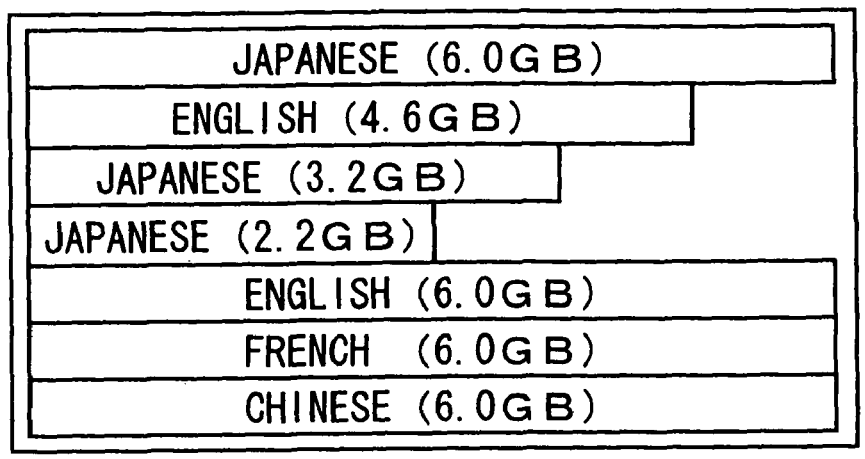
FIG. 9 is a diagram showing an exemplary configuration of collective control information.

FIG. 9 is a diagram showing an exemplary configuration of collective control information 140. In this embodiment, the information control edition section 117 collectively controls the plurality of pieces of program information the same in contents but different in compression ratio for an image, and the audio multiplexed program information. The program information is those received by the tuner module section 3 via the antenna 2. Such information is recorded on the first HDD section 116 as the collective control information 140.

In this embodiment, it is assumed that the program information of FIG. 7 is the same program information as the audio multiplexed program information of FIG. 8. In this embodiment, when the first HDD section 116 is recorded with the program information the same in contents but different in compression ratio for every channel as shown in FIG. 7, and the audio multiplexed program information 130 including the audio information for every language as shown in FIG. 8, such information is collectively recorded on the first HDD section 116 as the collective control information 140 by the information control edition section 117, as shown in FIG. 9.

As described in the foregoing, according to this embodiment, the same program information is collectively controlled, and is recorded on the first HDD section 116 as the collective control information 140. After the user specifies any specific collective control information 140 recorded on the first HDD section 116, the specified collective control information 140 is recorded on the second HDD section 122. When the information control edition section 117 edits the program information recorded on the first HDD section 116, and when the user-desired program information recorded on the second HDD section 122 is outputted, only by extracting the collective control information 140 recorded on the first and second HDD sections 116 and 122, it is possible to collectively extract any desired program information. This thus allows to extract any desired program information with ease and swiftness compared with a case where a plurality of pieces of program information is separately recorded so that the user's convenience can be increased.

Figure 10:
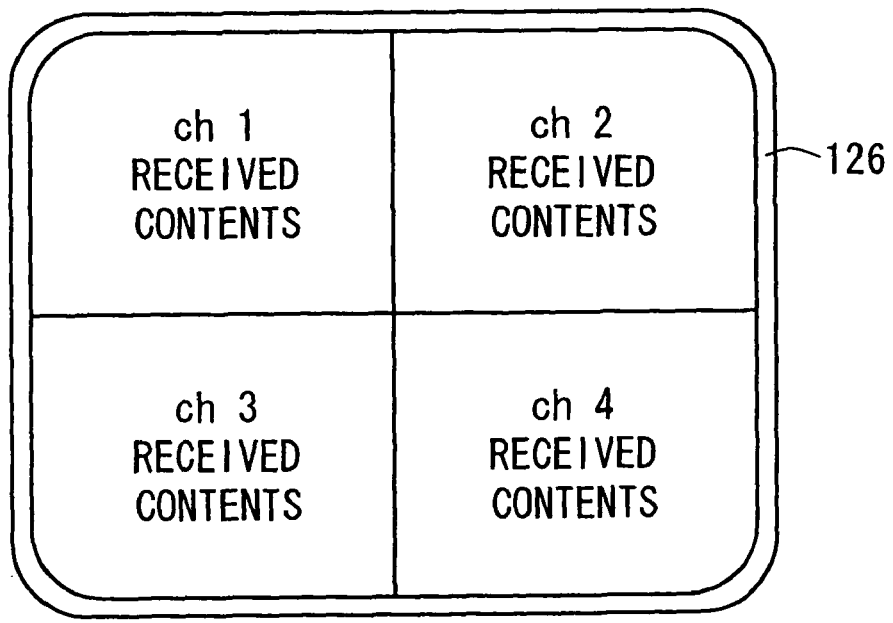
FIG. 10 is a diagram showing an exemplary display of collective control information.

FIG. 10 is a diagram showing an exemplary display of the collective control information 140. In this embodiment, the collective control information 140 is collectively controlled by the information control edition section 117, and includes at least either the program information or the audio multiplexed program information. When such collective control information 140 is outputted or edited, the collective control information 140 is outputted to the output device 126 that is externally provided. For easy understanding, FIG. 10 exemplarily shows a case where the program information included in the collective control information 140 on the four channels, more specifically, ch "1" to ch "4", is outputted to the output device 126.

When any desired program information is outputted, for viewing, among the plurality of pieces of program information included in the collective control information 140 recorded on the first and second HDD sections 116 and 122 for a plurality of channels, and when such program information is to be recorded on any external recording medium, by looking at the program information for every channel included in the collective control information 140 which program information is displayed on the output device 126, the user can select any desired program information easily and swiftly. This favorably increases the user's usability for use.

As described in the foregoing, in the embodiment, the first decoder section 118 decodes the program information recorded on the first HDD section 116 so that the decoded information is outputted. The information processing section 119 extracts at least either the audio information or the image information from the decoded information outputted from the first decoder section 118. The related information generation section 120 generates the related information in which the decoded information outputted from the first decoder section 118 is related to the search information, which is at least any one of the identification information for identifying the user, and the audio or image information extracted by the information processing section 119, representing a search key for use by a user to search the program information. The second encoder section 121 encodes the related information generated by the related information generation section 120, and outputs the resulting encoded related-information. The control section 6 records the encoded related-information outputted by the second encoder section 121 as such on the second HDD section 122.

When the second HDD section 122 is recorded, after encoding, with the related information in which the decoded information is related to the identification information being the search information, even when the apparatus is used by a plurality of users, the users can be identified based on the identification information being the search information so that the program information corresponding to each user can be swiftly displayed. With such display of the program information, the users can easily and swiftly select the program information whichever they want to view. As such, the users can view desired program information immediately so that the users' convenience can be increased for use.

When the second HDD section 122 is recorded with, after encoding, the related information in which the decoded information is related to the audio or image information being the search information, the audio or image information being the search information related to the decoded information is displayed to the user. For selecting any desired program information, with the audio information displayed as such, the user listens to the audio information to select any desired program information, or with the image information, the user looks at the image information. This thus enables the user to select his or her desired program information with relative ease and swiftness. As such, the user can view desired program information immediately so that the users' convenience can be increased for use.

According to this embodiment, the image information in the program information includes still image information that represents a still image. The information processing section 119 extracts the still image information at any predetermined time intervals from the decoded information generated by the first decoder section 118. The information processing section 119 splits the decoded information into a plurality of pieces of partial decoded information at the time intervals same as those for extraction of the plurality of pieces of still image information. The related information generation section 120 generates the related information in which each of pieces of partial decoded information split by the information processing section 119 is related to the search information, which is each of pieces of still image information extracted by the information processing section 119. This related information is encoded by the second encoder section 121, and the resulting encoded related-information is outputted. The encoded related-information is recorded on the second HDD section 122 by the control section 6.

The plurality of pieces of still image information each of which is the search information related to partial decoded information is read from the encoded related-information recorded on the second HDD section 122 to be displayed to the user. With display of such still image information, the user becomes able to select immediately the still image information corresponding to the part of the program information that he or she wants to view. As such, with relative ease and swiftness, the user can view the program information corresponding to the selected still image information, more specifically, the part of the program information that he or she wants to view among one program information. This favorably can increase the user's convenience to a considerable degree.

According to this embodiment, the control section 6 judges whether or not a switching of the plurality of pieces of audio information included in the program information recorded on the first HDD section 116 is made from one to another. One audio information may be stereo sound or male voice, and another audio information may be monophonic sound or female voice.

When it is judged by the control section 6 that the audio information switching is made from one to another, the information processing section 119 extracts the still image information from the decoded information generated by the first decoder section 118. When it is judged by the control section 6 that such an audio information switching is made from one to another, the information processing section 119 splits the decoded information into a plurality of pieces of partial decoded information. The related information generation section 120 generates the related information by relating search information which is the still image information extracted by the information processing section 119, and the partial decoded information split by the information processing section 119. The related information is encoded by the second encoder section 121, and the resulting encoded related-information is outputted. The encoded related-information is recorded by the control section 6 on the second HDD section 122.

For output of the program information, the information recording/outputting apparatus 100 reads the still image information from the encoded related-information recorded on the second HDD section 122 for display to the user. The still image information to be read out as such is the one being the search information related to the partial decoded information, and the one obtained when the control section 6 judges that such an audio information switching is made from one to another. With display of the still image information, the user can select immediately the still image information corresponding to the part of the program information that he or she wants to view among the displayed still image information. The program information selected by the user is outputted from the point in time of the audio information switching from one to another.

As such, the audio information is not outputted at some midpoint, e.g., in the middle of a sentence, so that the user never feel it difficult to understand what is going on in the program information. What is more, with relative ease and swiftness, the user can view the program information corresponding to his or her selected still image information, more specifically, the program information of any specific part he or she wants to view. This thus increases the user's convenience to a considerable degree for use.

In the embodiment, in the related information generated by the related information generation section 120, the decoded information outputted from the first decoder section 118 is related to the search information, which is the still image information extracted by the information processing section 119. The total number of the related information in which the still image information is related to the decoded information is defined by the user through operation of the operation section 102. The control section 6 determines whether or not to use the still image information as the search information that is to be related to the decoded information, based on the total number of the related information defined as above.

When the total number of related information recorded on the second HDD section 122 is smaller than the total number of related information previously defined, the still image information is used as the search information. When the total number of the related information recorded on the second HDD section 122 is equal to or larger than the total number of related information previously defined, the search information will be information, the amount of which is smaller than the still image information, e.g., text information.

As such, by determining whether or not to use the still image information as the search information for the related information based on the total number of the related information previously defined by an input from the operation section 102, it is possible to prevent information amount of the search information to be related to the decoded information from increasing. This enables to minimize the recording capacity required for the related information to be recorded on the second HDD section 122 after encoding by the second encoder section 121. This thus prevents occurrence of inconvenience that any program information cannot be recorded on the second HDD section 122 due to the insufficient recording capacity thereof. The free space of the second HDD section 122 can be thus reserved so that the second HDD section 122 can be effectively used.

The embodiment described above is no more than an example of the invention, and it is understood that numerous other configurations can be devised without departing from the scope of the invention. In the above embodiment, the search information is defined by the user inputting at least any one of the identification information, and the image and audio information provided from the information processing section 119 through user operation of the operation section 102. This is surely not the only possible configuration.

In another embodiment of the invention, the control section 4 detects the free space of the second HDD section 122. Based on the free space detected by the control section 6, the related information generation section 120 is so controlled by the control section 6 as to generate the related information using, as the search information, at least one of the identification information, and the audio and image information. When the control section 6 detects that the remaining free space of the second HDD section 122 is relatively small, the related information generation section 120 generates the related information with the search information, the amount of which is relatively small, e.g., identification information. When the control section 6 detects that the remaining free space of the second HDD section 122 is relatively large, the related information generation section 120 generates the related information with the search information, the amount of which is relatively large, e.g., still image information.

As described in the foregoing in accordance with the free space of the second HDD section 122, by changing the information as appropriate for use as the search information, the free space of the second HDD section 122 can be effectively used.

The receiver apparatuses 30, 40, and 60 of the second, third, and fourth embodiments are equipped to the information recording/outputting apparatus body 101 so that, similarly to the first embodiment, the resulting information recording/outputting apparatus can reduce both the manufacturing cost and the power consumption.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A receiver apparatus capable of receiving program signals relating to programs provided from a broadcasting station for a plurality of channels different in frequency band, comprising:
    a first signal processing unit configured by an integrated circuit, for applying signal processing to the received program signals;
    a second signal processing unit disposed on a downstream of the first signal processing unit, for applying signal processing to the signals provided from the first signal processing unit, the second signal processing unit being configured by an integrated circuit; and
    a control section for issuing to the first and second signal processing units a predetermined command to cause the first and second signal processing units to apply signal processing,
    wherein the first signal processing unit includes:
    a first filter unit that passes therethrough any of the program signals of a first frequency band selectively from the program signals for the channels;
    an amplification unit for amplifying the program signal provided from the first filter unit;
    a splitting unit for splitting the program signal provided from the amplification unit for every channel;
    a local oscillator for generating an oscillation signal of a predetermined oscillation frequency;
    a mixer unit for mixing the program signals of the channels as a result of splitting by the splitting unit with the oscillation signal generated by the local oscillator to generate mixed signals;
    a gain control unit for controlling a gain of the mixed signals generated by the mixer unit; and
    a second filter unit that passes therethrough any of the mixed signals of a second frequency band selectively from the mixed signals provided from the gain control unit,
    wherein the second signal processing unit includes:
    a conversion unit for converting the mixed signal provided from the second filter unit into a digital signal;
    a third filter unit that passes therethrough any of the digital signals of a third frequency band selectively from the digital signals provided from the conversion unit; and
    a demodulation unit that demodulates the digital signal provided from the third filter unit, and
    wherein a passing frequency bandwidth of the first filter unit can be controlled externally such that program signals of a plurality of predetermined channels are included.

2. The receiver apparatus of claim 1, wherein the demodulation unit is a digital signal processor.

3. The receiver apparatus of claim 1, wherein at least any one of a passing frequency bandwidth of the first filter unit, a conversion signal level of the conversion unit, and a passing signal level of the third filter unit is configured to be variable.

4. The receiver apparatus of claim 1, wherein the conversion unit is a delta-sigma analog-digital converter.

5. The receiver apparatus of claim 1, wherein the mixer unit carries out frequency conversion from the program signal to the mixed signal by direct conversion.

6. The receiver apparatus of claim 1, wherein the control section exercises control over the first filter unit in such a manner that the first filter unit has a smaller one of a passing frequency bandwidth of twice or smaller than a minimum reception frequency of the program signal, or a passing frequency bandwidth of half or smaller than a maximum reception frequency of the program signal.

7. The receiver apparatus of claim 1, further comprising another mixer unit and another local oscillator which are provided on the downstream of the amplification unit and on the upstream of the splitting unit, wherein the another local oscillator is capable of generating an oscillation signal, and the another mixer unit mixes the program signal outputted from the amplification unit and the oscillation signal generated by the another local oscillator to generate a mixed signal.

8. The receiver apparatus of claim 7, wherein the mixer unit is configured by a passive mixer circuit, and the another mixer unit is configured by an active mixer circuit.

9. An information recording/outputting apparatus equipped with the receiver apparatus of claim 1.

* * * * *